(12) United States Patent
Nagumo et al.

(10) Patent No.: US 7,075,674 B2
(45) Date of Patent: Jul. 11, 2006

(54) IMAGE RECORDING APPARATUS

(75) Inventors: Akira Nagumo, Tokyo (JP); Toshiki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 900 days.

(21) Appl. No.: 09/783,011

(22) Filed: Feb. 15, 2001

(65) Prior Publication Data
US 2001/0017715 A1    Aug. 30, 2001

(30) Foreign Application Priority Data
Feb. 29, 2000  (JP)  ............................ 2000-053131

(51) Int. Cl.
*G06F 15/00*  (2006.01)

(52) U.S. Cl. .................. 358/1.16; 358/1.9; 358/409; 358/410; 358/411; 347/129; 347/130; 347/132

(58) Field of Classification Search .............. 358/1.16, 358/1.9, 3.09, 409–411; 347/128, 130, 132
See application file for complete search history.

(56) References Cited

U.S. PATENT DOCUMENTS

| | | | | |
|---|---|---|---|---|
| 5,138,310 A | * | 8/1992 | Hirane et al. ................ 345/82 |
| 5,142,301 A | * | 8/1992 | Matsumoto ................. 347/184 |
| 5,386,539 A | * | 1/1995 | Nishi ........................ 711/115 |
| 5,450,208 A | * | 9/1995 | Murata ...................... 358/296 |
| 5,539,525 A | * | 7/1996 | Tanuma et al. ............ 358/3.02 |
| 5,553,202 A | * | 9/1996 | Wakabayashi et al. ..... 358/1.16 |
| 5,669,720 A | * | 9/1997 | Negishi et al. ......... 400/120.05 |
| 5,734,406 A | * | 3/1998 | Nakamura et al. .......... 347/132 |
| 5,771,340 A | * | 6/1998 | Nakazato et al. .......... 358/1.15 |
| 5,815,025 A | * | 9/1998 | Kubota ...................... 327/514 |
| 5,864,253 A | * | 1/1999 | Katakura et al. ........... 327/297 |
| 5,959,650 A | * | 9/1999 | Fukui et al. ................ 347/132 |
| 5,978,009 A | * | 11/1999 | Fujikura .................... 347/237 |

* cited by examiner

*Primary Examiner*—Joseph R. Pokrzywa
*Assistant Examiner*—Mark R. Milia
(74) *Attorney, Agent, or Firm*—Rabin & Berdo, P.C.

(57) ABSTRACT

When correction data is set, a CPU 3 reads out the correction data from an EEPROM 8 through strobe signal lines STB1-N to STB4-N and supplies it as print data signals DATA3 to DATA0 to an LED driver IC 6. When the driving of an LED array 7 according to print data is instructed, the CPU 3 supplies a group selection signal to the LED array 7 through the strobe signal lines STB1-N to STB4-N. An electrophotographic printer which can realize a high speed of the operation and contribute to the improvement of the reliability is provided.

18 Claims, 24 Drawing Sheets

| ADDRESS | b3 | b2 | b1 | b0 | |
|---|---|---|---|---|---|
| $000 | — | — | — | chip26 bit3 | ↑ |
| $001 | dot2496 bit3 | dot2495 bit3 | dot2494 bit3 | dot2493 bit3 | |
| $002 | dot2492 bit3 | dot2491 bit3 | dot2490 bit3 | dot2489 bit3 | |
| ~ | | | | | |
| $0017 | dot2408 bit3 | dot2407 bit3 | dot2406 bit3 | dot2405 bit3 | |
| $0018 | dot2404 bit3 | dot2403 bit3 | dot2402 bit3 | dot2401 bit3 | |
| $0019 | — | — | — | chip25 bit3 | BIT 3 OF CORRECTION DATA |
| $001A | dot2400 bit3 | dot2399 bit3 | dot2398 bit3 | dot2397 bit3 | |
| ~ | | | | | |
| $031 | dot2308 bit3 | dot2307 bit3 | dot2306 bit3 | dot2305 bit3 | |
| ~ | | | | | |
| $271 | — | — | — | chip1 bit3 | |
| $272 | dot96 bit3 | dot95 bit3 | dot94 bit3 | dot93 bit3 | |
| ~ | | | | | |
| $289 | dot4 bit3 | dot3 bit3 | dot2 bit3 | dot1 bit3 | ↓ |
| | — | — | — | chip26 bit2 | ↑ |
| | dot2496 bit2 | dot2495 bit2 | dot2494 bit2 | dot2493 bit2 | BIT 2 OF CORRECTION DATA |
| | | | | | |
| $513 | dot4 bit2 | dot3 bit2 | dot2 bit2 | dot1 bit2 | ↓ |
| $514 | — | — | — | chip26 bit1 | ↑ |
| $515 | dot2496 bit1 | dot2495 bit1 | dot2494 bit1 | dot2493 bit1 | BIT 1 OF CORRECTION DATA |
| ~ | | | | | |
| $79D | dot4 bit1 | dot3 bit1 | dot2 bit1 | dot1 bit1 | ↓ |
| $79E | — | — | — | chip26 bit0 | ↑ |
| $79F | dot2496 bit0 | dot2495 bit0 | dot2494 bit0 | dot2493 bit0 | BIT 0 OF CORRECTION DATA |
| ~ | | | | | |
| $27A | dot4 bit0 | dot3 bit0 | dot2 bit0 | dot1 bit0 | ↓ |
| $27B | — | — | — | — | ↑ |
| ~ | | | | | NOT USED |
| $FFFF | — | — | — | — | ↓ |

PRIOR ART

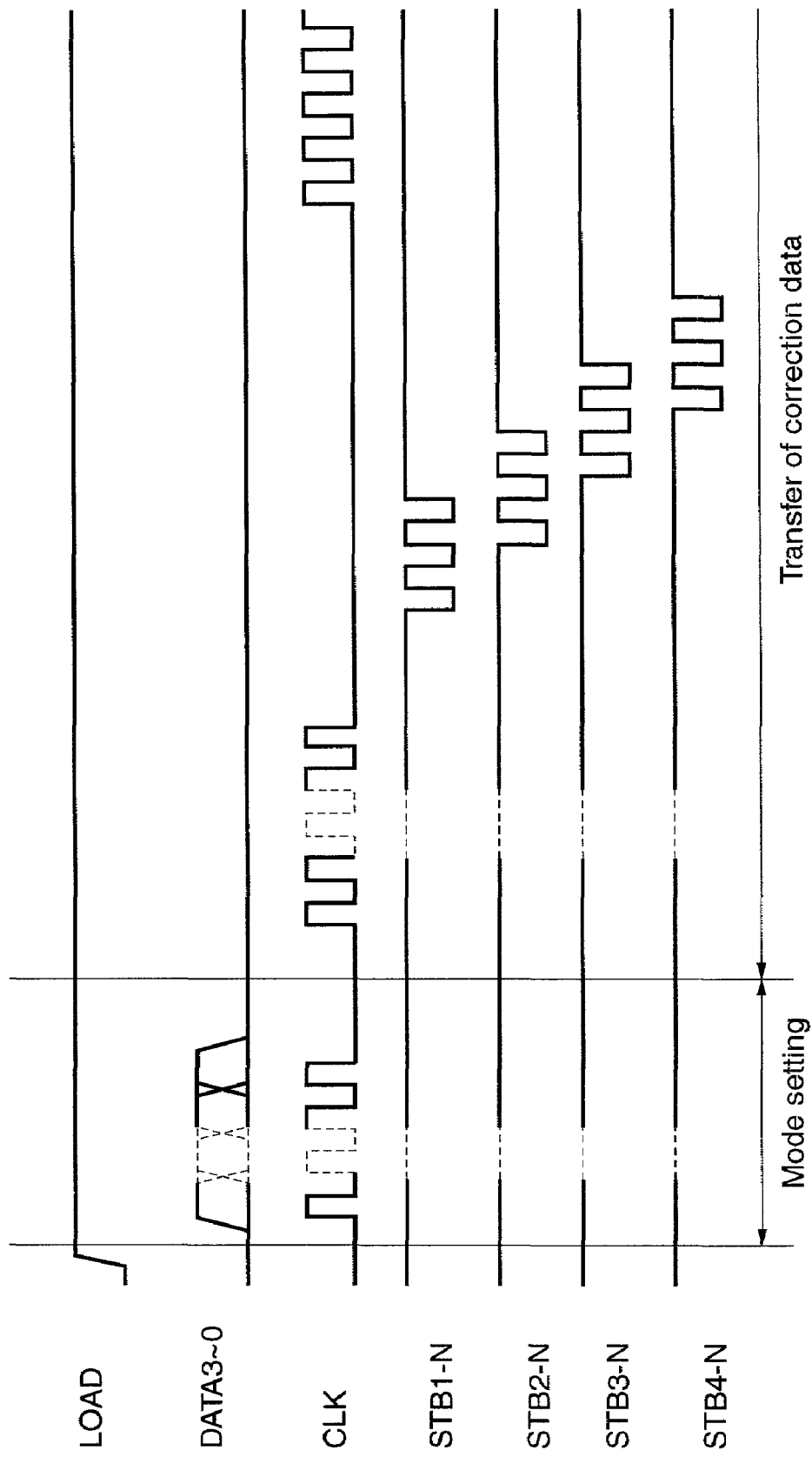

IMAGE RECORDING APPARATUS

BACKGROUND OF THE INVENTION

1. Field of the Invention

The invention relates to an image recording apparatus and, more particularly, to an image recording apparatus for dividing elements to be driven such as a number of LED elements, exothermic resistors, or the like which are arranged.

2. Related Background Art

In an image recording apparatus such as an electrophotographic printer or the like, a photosensitive drum having a photosensitive material such as a thin organic film or the like is charged, an electrostatic latent image corresponding to a video signal or the like is formed onto the surface of the photosensitive drum by recording light generated by an LED or the like, thereafter, toner is deposited onto the photosensitive drum, the electrostatic latent image is developed, a toner image formed by the development is transferred onto a paper, and the transferred toner image and the paper are further adhered with a pressure while applying a heat thereto, thereby fixing the toner image onto the paper.

FIG. 16 is a block diagram showing a construction of a main portion such as a printing mechanism or the like of such a conventional electrophotographic printer. FIGS. 17 and 18 are time charts showing the printing operation of the conventional electrophotographic printer.

As shown in FIG. 16, the electrophotographic printer comprises: a print controller 1 for controlling the operation such as printing or the like; an LED head 2 for emitting recording light under a control of the print controller 1; a photosensitive drum (not shown) for forming an electrostatic latent image according to the recording light from the LED head 2; a developer 27 for developing the electrostatic latent image on the photosensitive drum; a conveying portion (not shown) for conveying a recording medium such as a recording paper or the like; a transfer device 13 for transferring a developed toner image onto the recording medium; a fixing device 23 for fixing the transferred image; and the like.

The print controller 1 is constructed by a microprocessor, an ROM, an RAM, an input/output port, a timer, and the like and connected to an external information processing apparatus such as a personal computer or the like. The print controller 1 allows each operating unit such as a printer to execute a process such as a printing operation or the like in response to signals such as control signal SG1 from an upper controller or the like for controlling the whole operation of the electrophotographic printer and video signal SG2 constructed by data or the like in which bit map data has one-dimensionally been arranged and the like.

The LED head 2 has a predetermined number of LED elements which are linearly arranged and generate the recording light corresponding to one dot (pixel).

In the conventional electrophotographic printer constructed as mentioned above, when a print is instructed, the upper controller forms data in which print data in, for example, a bit map format has one-dimensionally been arranged, instructs the electrophotographic printer to print by the control signal SG1, and supplies the arranged and formed data as a video signal SG2 to the print controller 1.

When the print instruction from the upper controller is detected by monitoring the control signal SG1, the print controller 1 first discriminates whether a temperature of the fixing device 23 having a heater 23a therein lies within a temperature range where it can be used or not by a fixing device temperature sensor 22. When it is out of the temperature range, the print controller 1 supplies a current to the heater 23a, thereby heating the fixing device 23 up to a temperature at which it can be used.

Subsequently, the print controller 1 rotates a motor (PM) 15 for development and transfer process through a driver 14 and, further, validates a charge signal SGC, thereby making a high voltage power source 24 for charging operative so as to apply a voltage to a charging device 12 and charging the surface of the photosensitive drum (not shown).

The print controller 1 detects the presence or absence and the kind of paper set in the electrophotographic printer by a paper remaining amount sensor 20 and a paper size sensor 21, respectively. When the presence of the paper to be used for printing is detected, the print controller 1 starts a paper feed through a driver 16. A paper feed motor (PM) 17 can be bidirectionally rotated. When the paper feed is started, first, the paper feed motor (PM) 17 is reversely rotated and the set paper is conveyed by a distance of a predetermined amount until a paper inlet port sensor 18 detects the paper. Subsequently, the paper feed motor (PM) 17 is forwardly rotated, thereby conveying the paper into the printing mechanism in the electrophotographic printer.

When the paper reaches a printable position, the print controller 1 supplies a timing signal SG3 including a main scan sync signal and a sub-scan sync signal to the upper controller. The upper controller sets the data formed by one-dimensionally arranging the print data as mentioned above to the video signal SG2 and supplies it to the print controller 1 every print line synchronously with the timing signal SG3.

The print controller 1 sets the supplied video signal SG2 to a print data signal DATA and sequentially supplies it to the LED head 2 synchronously with a clock signal CLK generated separately. When the supply of the print data signal DATA of one line is finished, the print controller 1 validates a load signal LOAD (set it to the high level) which is supplied to the LED head 2 for a predetermined period of time, thereby allowing the print data specified by the print data signal DATA to be held in the LED head 2.

After the print data was held in the LED head 2, the print controller 1 sets a strobe signal (STB-N) to the low level for a predetermined period of time. The strobe signal is used for driving the LED head 2 which is operated in accordance with the print data held in the LED head 2. When the strobe signal is at the low level, the LED head 2 drives each of the foregoing LED elements in accordance with the holding print data so as to emit the recording light.

The print controller 1 makes it possible to execute the print according to the print data held in the LED head 2 even during the reception of the video signal SG2 of the next line from the upper controller.

A very large number of LED elements in the LED head 2 are necessary, for example, 2496 LED elements are necessary in order to print an image onto the paper of the A4 size at a resolution of 300 dpi (dots per inch). If it is intended to simultaneously drive all of the LED elements, a peak of a drive current becomes high. In the electrophotographic printer, therefore, the LED elements are divided into four groups and driven every group, thereby reducing the peak of the drive current.

To realize such a divisional driving, the strobe signal (STB-N) is divided into a plurality of strobe signals STB1-N ("-N" at the end shows a negative logic which is validated at the low level), STB2-N, STB3-N, and STB4-N corresponding to those groups.

For example, in the LED head 2 using the 2496 LED elements as mentioned above, the 1st to 624th LED elements are allowed to emit the light in response to the strobe signal STB1-N, the 625th to 1248th LED elements are allowed to emit the light in response to the strobe signal STB2-N, the 1249th to 1872nd LED elements are allowed to emit the light in response to the strobe signal STB3-N, and the 1873rd to 2496th LED elements are allowed to emit the light in response to the strobe signal STB4-N, respectively.

As shown in FIG. 18, the strobe signals STB1-N to STB4-N are not simultaneously validated (are set to the low level) but are validated in order from the strobe signal STB1-N to the strobe signal STB4-N. Thus, since the LED elements divided into the four groups emit the light every group, the peak of the drive current of the LED elements is reduced.

Referring again to FIG. 16, the recording light emitted from each LED element is irradiated onto the photosensitive drum charged to a negative potential by the charging device 12 as mentioned above. An irradiation light spot corresponding to each LED element is visualized as a dot of the increased potential. In the developer 27, toner for image formation which was charged to the negative potential by a high voltage power source 26 for development is sucked to each dot by an electrical sucking force, so that a toner image is formed.

When the formed toner image is sent to a position which faces the transfer device 13 by a rotation of the photosensitive drum, it is transferred by a transfer signal SG4 onto the paper which passes through a gap between the photosensitive drum and the transfer device 13 to which a negative voltage has been applied by a high voltage power source 25 for transfer whose operation was started.

After that, when the paper to which the toner image has been transferred is come into contact with the fixing device 23 having the heater 23a therein and conveyed, the toner image is fixed onto the paper by the heat generated from the fixing device 23. The paper on which the toner image has been fixed is further conveyed, passes through a paper ejection port sensor 19 from the printing mechanism of the printer, and is ejected to the outside of the printer.

In response to the detection of each of the paper size sensor 21 and paper inlet port sensor 18, the print controller 1 applies the voltage from the high voltage power source 25 for transfer to the transfer device 13 only while the paper is passing the transfer device 13. When the print is finished and the paper passes through the paper ejection port sensor 19, the application of the voltage to the charging device 12 by the high voltage power source 24 for charging is finished and, at the same time, the rotation of the motor 15 for development and transfer process is stopped.

The details of the LED head 2 in FIG. 16 will now be described.

FIG. 19 is a diagram showing an example of a structure of the LED head 2 in FIG. 16 mentioned above. As shown in FIG. 19, the LED head 2 comprises: 2496 latch circuits $LT_1$, $LT_2$, . . . , and $LT_{2496}$ corresponding to, for example, 2496 LED elements $LD_1$, $LD_2$, . . . , and $LD_{2496}$; 2496 flip-flop circuits $FF_1$, $FF_2$, . . . , and $FF_{2496}$ for supplying outputs to the corresponding latch circuits $LT_1$ to $LT_{2496}$; NAND gate circuits $G_1$, $G_2$, . . . , and $G_{2496}$ in each of which the AND of the inverted load signal LOAD and the inverted strobe signal STB-N is supplied to one input terminal and an output of each of the corresponding latch circuits $LT_1$ to $LT_{2496}$ is supplied to the other input terminal; and switching elements $TR_1$, $TR_2$, . . . , and $TR_{2496}$ for controlling the supply of a drive current from a power source $V_{DD}$ to the LED elements $LD_1$ to $LD_{2496}$ in accordance with outputs of the corresponding NAND gate circuits $G_1$ to $G_{2496}$.

The print data signal DATA is supplied to an input of the flip-flop circuit $FF_1$ and an output of the flip-flop circuit $FF_1$ is supplied to the flip-flop circuit $FF_2$ at the second stage and the latch circuit $LT_1$. An output of the flip-flop circuit $FF_2$ at the second stage is supplied to the flip-flop circuit $FF_3$ at the third stage and the latch circuit $LT_2$ at the second stage. Further, the flip-flop circuits $FF_4$ to $FF_{2496}$ at the third and subsequent stages are also similarly connected. The clock signal CLK is supplied to each of the flip-flop circuits $FF_1$ to $FF_{2496}$.

The flip-flop circuits $FF_1$ to $FF_{2496}$ function as shift registers for holding the value of the inputted print data signal DATA as print data and sequentially shifting the print data to the post stage in response to the clock signal supplied to each flip-flop circuit until the print data signal DATA as much as one line is supplied to the flip-flop circuits $FF_1$ to $FF_{2496}$.

The print data for driving the LED elements $LD_1$ to $LD_{2496}$ is supplied as a print data signal DATA to the flip-flop circuit $FF_1$ at the first stage and sequentially transferred to the flip-flop circuits at the post stage in response to the clock CLK.

When the print data signal DATA of one line is supplied to the flip-flop circuits $FF_1$ to $FF_{2496}$, the load signal LOAD is validated (set to the high level). Thus, the print data of one line held in the flip-flop circuits $FF_1$ to $FF_{2496}$ is held in the corresponding latch circuits $LT_1$ to $LT_{2496}$.

An output of an AND circuit $L_{AND}$ is set to the high level when the load signal LOAD inputted to the AND circuit is invalid (at the low level) and the strobe signal STB-N is valid (at the low level). Outputs of the NAND gate circuits $G_1$ to $G_{2496}$ are set to the low level when both inputs of each NAND gate circuit are at the high level, respectively. Since the switching elements $TR_1$ to $TR_{2496}$ are the p-type elements, they are made conductive when the output of the NAND gate supplied to the gate is at the low level. Therefore, when the load signal LOAD is at the low level, the strobe signal STB-N is at the low level, and the data held in the latch circuits $LT_1$ to $LT_{2496}$ is at the high level, the corresponding switching elements $TR_1$ to $T_{2496}$ are made conductive and supply the drive current from the power source $V_{DD}$ to the corresponding LED elements $LD_1$ to $LD_{2496}$.

Therefore, when the strobe signal STB-N is validated (set to the low level), the LED elements in which the high level data has been held in the corresponding latch circuits $LT_1$ to $LT_{2496}$ among the LED elements $LD_1$ to $LD_{2496}$ are lit on.

In the printer using the LED head 2 having such a construction, all of the LED elements $LD_1$ to $LD_{2496}$ of the LED head 2 are driven for the same time by the strobe signal STB-N. However, if there are variations in characteristics of the switching elements $TR_1$ to $TR_{2496}$ arranged every LED elements $LD_1$ to $LD_{2496}$, the LED elements $LD_1$ to $LD_{2496}$, and the like, a variation also occurs in the light emission amounts of the LED elements. Thus, a difference occurs in sizes of the dots of the electrostatic latent image formed on the photosensitive drum and a difference also occurs in sizes of dots of an image which is actually printed.

FIG. 20 is a diagram showing a construction of the LED head 2 and a variation of the light amounts (light emitting powers) of the LED elements of the LED head 2.

An upper portion of FIG. 20 shows a constructional example of the LED head 2. In this constructional example, the LED elements $LD_1$ to $LD_{2496}$ as many as 2496 dots shown in FIG. 19 mentioned above are constructed by arranging 26 LED arrays CHP1 to CHP26 each having 96 LED elements. In the constructional example, driver ICs (DRV1 to DRV26) have: the flip-flop circuits $FF_1$ to $FF_{2496}$ for driving the LED elements $LD_1$ to $LD_{2496}$ in the LED arrays CHP1 to CHP26; latch circuits $LT_1$ to $LT_{2496}$; switching elements $TR_1$ to $TR_{2496}$; and the like. Each of the driver ICs (DRV1 to DRV26) drives the 96 LED elements in the corresponding LED array. The flip-flop circuits $FF_1$ to $FF_{2496}$ in each of the driver ICs (DRV1 to DRV26) are cascade connected and a shift register similar to that described above is constructed by those flip-flop circuits $FF_1$ to $FF_{2496}$.

A graph in the lower portion in FIG. 20 shows a relation between the position of the LED element and the light amount in comparison with the LED array (CHP1 to CHP26).

A broken line (lateral line) shows a range of the variation of the light amounts (variation between the dots) with respect to the LED elements belonging to the same LED array. An alternate long and short dash line shows a range of the variation of the mean light amounts (variation between the chips) of the LED elements belonging to each LED array.

In such an LED head 2, the variation of the mean light amount between the driver ICs or between the LED arrays is larger than the variation of the light amounts of LED elements in the driver ICs constructing the LED head or between the LED elements in the LED array. Therefore, hitherto, the LED arrays have been divided into ranks of a plurality of groups on the basis of the measurement results of the mean light amounts, the LED arrays belonging to the same rank have been selected, and the LED head has been constructed by the selected LED arrays, thereby reducing the variation of the light amounts of the LED elements.

On the other hand, the variation of the light amounts of the LED elements appears as a variation of an exposing energy at the time of exposure of the photosensitive drum and becomes a variation of sizes of dots after the development. However, in case of printing a binary image constructed by characters or the like, even if there is a small difference of the dot sizes, it can be almost ignored.

However, in case of printing a multigradation image such as a photograph or the like, if there is a difference among the dot sizes, a variation occurs in print densities and a print quality deteriorates. It is, therefore, undesirable.

To prevent such a drawback, there has been known an electrophotographic printer apparatus constructed in such a manner that a light amount of each LED element is preliminarily measured, correction data corresponding to the light amount of each LED element is formed and held, and a drive current of each LED element is controlled in accordance with the correction data upon driving of the LED elements, thereby reducing an influence of the variation of the light amount of each LED element.

FIG. 21 is a block diagram showing a more detailed construction of the conventional print controller 1 and LED head 2 in case of performing such a correction.

As shown in FIG. 21, the print controller 1 has a CPU 3 and an RAM 4 and an ROM 5 which are connected to the CPU 3.

The CPU 3 receives the video signal from the upper controller, converts the received video signal into a bit map format, forms print data, and supplies the formed print data as a print data signal DATA to the LED head 2.

The LED head 2 comprises: an LED array 7 constructed by arranging a number of LED elements; an LED driver IC 6 for controlling a light emission of the LED array 7; and a non-volatile memory 8 such as an EEPROM (electrically writable and erasable ROM) (hereinafter, simply referred to as an EEPROM) for storing correction data for correcting a variation of light emission intensity of each LED element of the LED array 7. A read-out output from the EEPROM 8 is supplied to a portion for holding the correction data in the LED driver IC 6, for example, to a memory cell (not shown). Each switching element in the LED driver IC 6 and each LED element in the LED array 7 are connected by a wire (not shown).

Each signal from the print controller 1 is supplied to the LED driver IC 6 through a correcting operation control IC 11. That is, upon printing, the DATA signal as a print data signal is supplied from the print controller 1 to the LED driver IC 6 through the correcting operation control IC 11. On the other hand, when the correction data is set prior to printing, the correcting operation control IC 11 reads out the correction data from the EEPROM 8 under the control of the correcting operation control IC and supplies the correction data to the LED driver IC 6.

FIG. 22 shows an example of the correction data which is stored in the EEPROM 8. As shown in FIG. 22, the correction data is separately stored every bit. Information regarding bit 3 of the correction data for all dots is sequentially stored in head addresses among the addresses in the EEPROM 8 in order of the addresses. Each information regarding bit 2, bit 1, and bit 0 of the correction data is similarly sequentially stored in the other addresses toward the lower direction in the diagram in order of the addresses.

FIG. 23 is a time chart showing the operation in case of setting the correction data into the LED head 2.

When the correction data is set, as shown in FIG. 23, the CPU 3 sets the load signal LOAD to the high level. The CPU 3 supplies the data for setting the correcting operation control IC 11 into a correcting mode for performing the correcting operation to the correcting operation control IC 11 through a data signal line DATA synchronously with the clock CLK. Thus, the correcting operation control IC 11 is set into the correcting mode. In the correcting mode, the correcting operation control IC 11 reads out the correction data from the EEPROM 8 in response to an internal clock SCK (refer to FIGS. 24 and 25) which is formed on the basis of the clock CLK from the CPU 3 and supplies the read-out correction data to the LED driver IC 6. When the correction data from the correcting operation control IC 11 is received, the LED driver IC 6 sequentially transfers it to the shift register provided for, for example, the LED driver IC 6.

After completion of the generation of a predetermined number of clocks CLK, the CPU 3 sequentially changes the four strobe signals STB1-N to STB4-N. In response to it, the LED driver IC 6 holds the correction data into the internal memory cell or the like.

FIG. 24 is a time chart in case of writing the data into the EEPROM 8 from the CPU 3 through the correcting operation control IC 11. FIG. 25 is a time chart in the case where the correcting operation control IC 11 reads out the data from the EEPROM 8.

When the data is written into the EEPROM 8, as shown in FIG. 24, first, a signal which is inputted to a CS-N terminal (chip selection terminal) provided for the EEPROM 8 is set to the low level, thereby enabling the EEPROM 8 to operate.

Subsequently, when the SCK clock as an internal clock of the correcting operation control IC 11 is supplied from the control IC 11 to an SCK terminal provided for the EEPROM 8 and mode setting data to set the EEPROM 8 into a writing mode is supplied to an SI terminal (data signal input terminal) provided for the EEPROM 8, the EEPROM 8 is set into the writing mode by this signal.

After the EEPROM 8 is set into the writing mode, address data as a target to be written is first supplied through the SI terminal on the basis of the SCK clock. Subsequently, when the write data is supplied, it is written into the designated address in the EEPROM 8.

When the data is read out from the EEPROM 8, as shown in FIG. 25, the CS-N terminal is first set to the low level, thereby enabling the EEPROM 8 to operate.

Subsequently, when the SCK clock as an internal clock is supplied from the correcting operation control IC 11 to the SCK terminal and data to set the EEPROM 8 into a reading mode is supplied to the SI terminal, the EEPROM 8 is set into the reading mode by this signal.

After the EEPROM 8 is set to the reading mode, when address data as a target to be read out is supplied through the SI terminal, the data is read out from an area in the EEPROM 8 corresponding to the address and outputted synchronously with the SCK clock supplied from the correcting operation control IC 11 to the SCK terminal.

According to the construction shown in FIG. 21, however, although the clock CLK from the CPU 3 is supplied to the correcting operation control IC 11 and LED driver IC 6, the internal clock SCK of the control IC 11 is supplied to the SCK terminal of the EEPROM 8 from the control IC 11. Therefore, the operation of the EEPROM 8 is controlled by the internal clock SCK from the control IC 11.

Since the internal clock from the correcting operation control IC 11 is formed in the control IC 11 on the basis of the clock CLK which is received by the control IC 11 from the CPU 3, a small delay occurs as compared with the clock CLK from the CPU 3.

On the other hand, as mentioned above, the LED driver IC 6 which receives the correction data from the EEPROM 8 operates synchronously with the clock CLK from the CPU 3. There is, consequently, a room for improvement from viewpoints of elimination of the deviation between both clocks mentioned above and the increase in reliability of the correcting operation.

Since a supplying timing of the correction data from the EEPROM 8 which is made operative by the internal clock SCK is delayed from the operating timing of the LED driver which is made operative by the clock CLK, if an operating speed is raised, there is a fear that the LED driver IC 6 cannot correctly receive the correction data and there is also a room of improvement from a viewpoint of realization of a high speed of the operation.

In the above construction, in addition to the signal line for supplying the print data from the correcting operation control IC 11 to the LED driver IC 6, the signal line for supplying the correction data is necessary. Thus, the number of wirings increases and the costs also increase.

The case where the LED head is used for printing onto the paper of the A4 size at 300 dpi has been described above. However, if the user intends to improve the resolution to 600 dpi, the LED elements of the number which is twice as large as that in case of 300 dpi, that is, 4992 LED elements are necessary. If the user intends to store the correction data of 16 gradations (4 bits) per LED element, a capacity of the correction data becomes 2496 bytes (=4992 dots×4 bits=19968 bits).

Therefore, in this state, the correction data cannot be recorded in the EEPROM of 2 kbytes. The capacity of the general memory such as an EEPROM or the like is provided only at predetermined intervals, for example, on a 2-kbyte unit basis for the purpose of suppression of the manufacturing kinds or the like. Thus, if the capacity of 2 kbytes is lacking as mentioned above, the EEPROM of 4 kbytes has to be used, resulting in an increase in costs than they are needed.

SUMMARY OF THE INVENTION

The invention is made in consideration of the above problems and it is an object of the invention to provide an image recording apparatus which can contribute to the improvement of reliability and the realization of a high speed of the operation.

Another object of the invention is to provide an image recording apparatus which can contribute to a reduction of costs.

To accomplish the above objects, according to the first aspect of the invention, there is provided an image recording apparatus comprising: a plurality of driven elements which are driven for printing of pixels constructing an image; a plurality of driving circuits which drive said driven elements; a memory for storing correction data for controlling the driving of each of said driven elements which is executed by said driving circuits; and a print controller for temporarily reading out the correction data from said memory and storing prior to a printing operation and transmitting the correction data to said driving circuits after completion of the reading operation of the correction data from said memory.

According to the second aspect of the invention, the memory and the driving circuits are provided in a head, and the print controller temporarily reads out the correction data from said memory provided in the head and transmits the correction data to the driving circuits provided in the head prior to the printing operation.

According to the third aspect of the invention compressed correction data is stored in the memory, the print controller has a decompressing circuit for decompressing the compressed correction data stored in the memory, and the print controller reads out the compressed correction data from said memory and decompresses it prior to the printing operation and transmits the decompressed correction data to said driving circuits.

According to the fourth aspect of the invention, the print controller has a compressing circuit for compressing the correction data to be stored into the memory and, when the correction data is stored into the memory, the correction data is compressed by the compressing circuit and written into the memory.

According to the fifth aspect of the invention, the driven elements are LED elements for emitting recording light.

According to the sixth aspect of the invention, the print controller is constructed so as to be connectable to an external upper apparatus, and when a read command of the correction data is received from the upper apparatus, the print controller reads out the correction data from the memory and transmits it to the upper apparatus.

According to the seventh aspect of the invention, the driven elements are thermal elements.

According to the eighth aspect of the invention, there is provided an image recording apparatus comprising: a plurality of driven elements which are driven for printing of pixels constructing an image; a plurality of driving circuits which drive the driven elements and are partitioned into a plurality of driving groups; a CPU for sending control signals through a plurality of control signal lines to the driving circuits of the driving group corresponding to the signal line so as to make the driving circuits operative every group upon printing operation and sending print data to each of the driving circuits through a print data line; a memory for storing correction data for correcting the driving of each of the driven elements; and an auxiliary memory for temporarily storing the correction data from the memory under a control of the CPU so as to supply the correction data of each of the driven elements stored in the memory to the driving mechanisms prior to the printing operation, wherein the correction data is sent from the auxiliary memory to the driving circuits through the print data lines under a control of the CPU.

According to the ninth aspect of the invention, the memory has control terminals for controlling the operation of the memory and data input/output terminals, and the control terminals and the input/output terminals are connected to the control signal lines, respectively.

According to the tenth aspect of the invention, the memory is subjected to an operation control for writing the correction data into the memory and reading out the correction data into the auxiliary memory by the control signals which are supplied from the control signal lines to the control terminals connected to the signal lines.

According to the eleventh aspect of the invention, the control signal lines are strobe signal lines.

According to the twelfth aspect of the invention, the memory is an EEPROM.

According to the thirteenth aspect of the invention, there is provided with a comprising compressing circuit for compressing the correction data which is stored in the memory, and the CPU decompresses the compressed correction data read out from the memory and supplies the decompressed data to the driving circuits through the auxiliary memory and the print data lines.

According to the fourteenth aspect of the invention, the memory has a data input terminal, a data output terminal, a selection terminal, and a clock terminal, and each of the control signal lines is connected to each of the terminal.

According to the fifteenth aspect of the invention, the control signal lines other than the control signal lines which are link-driven are connected to the selection terminal and the clock terminal of the memory.

According to the sixteenth aspect of the invention, the memory further has a write inhibition terminal, and the print controller (CPU) transmits a permission signal (LOAD) to permit the driving of the driven elements to the driving circuits and the write inhibition terminal of the memory and, when the driving of the driven elements is permitted by the permission signal, the writing operation to the memory is inhibited.

The above and other objects and features of the present invention will become apparent from the following detailed description and the appended claims with reference to the accompanying drawings.

BRIEF DESCRIPTION OF THE DRAWINGS

FIG. 11 is a diagram showing an example of correction data;

FIG. 12 is a diagram showing an example of compressed correction data;

FIG. 13 is a flowchart showing processes such as formation of correction data and the like;

FIG. 22 is an address map showing an example of correction data which is stored in an EEPROM constructing the conventional LED head;

FIG. 23 is a time chart showing the correcting operation;

DETAILED DESCRIPTION OF THE PREFERRED EMBODIMENTS

The invention can be applied to a driving apparatus for driving driven elements such as a plurality of LED elements constructing an LED head which is used in, for example, an electrophotographic printer or the like, a plurality of exothermic resistors constructing a thermal head which is used in a thermal printer or the like, a plurality of display elements constructing a display apparatus, or the like.

Figure 1:
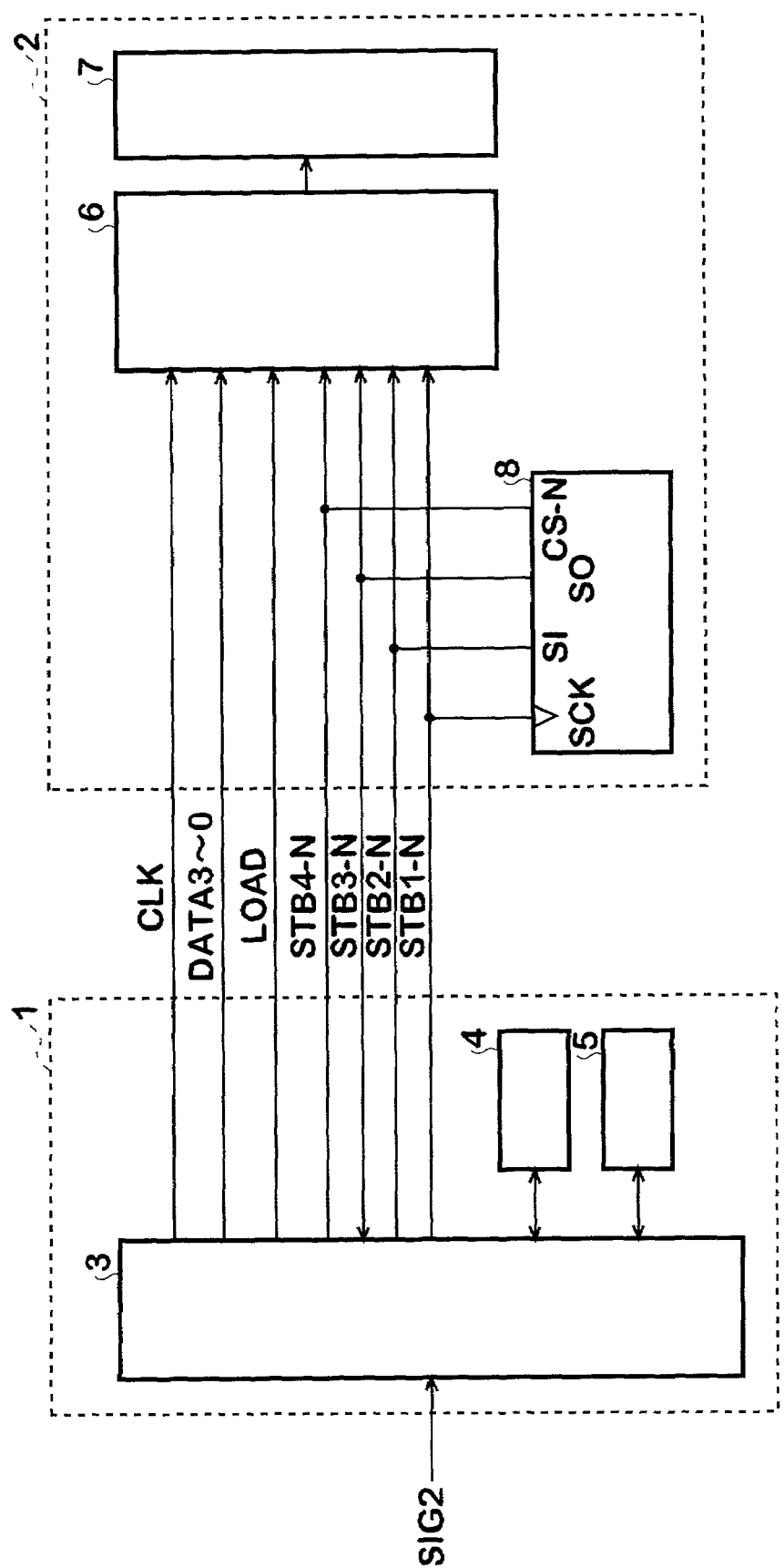
FIG. 1 is a block diagram showing a construction of an electrophotographic printer according to the first embodiment of the invention.

FIG. 1 is a block diagram showing a construction of a main section of an electrophotographic printer according to the first embodiment to which the invention is applied. The electrophotographic printer comprises: the print controller 1 for controlling the operation such as print or the like; and the LED head 2 for generating recording light by a control of the print controller 1. Although not shown, in a manner similar to the conventional one, the electrophotographic printer further comprises: a photosensitive drum for forming an electrostatic latent image according to the recording light from the LED head 2; a developer for developing the electrostatic latent image on the photosensitive drum; a conveying unit for conveying a recording medium such as a recording paper or the like; a transfer unit for transferring a developed toner image onto the recording medium; a fixing unit for fixing the transferred image; and the like.

As shown in FIG. 1, the print controller 1 has: the CPU 3 for performing the foregoing control or the like; and the RAM 4 and ROM 5 connected to the CPU 3. An upper controller or the like is connected to an external information processing apparatus such as personal computer, workstation, or the like and controls the whole operation of the electrophotographic printer. By executing a processing program stored in, for example, the ROM 5 or the like, the print controller 1 forms print data on the basis of control signals which are supplied from the upper controller or the like, a video signal, or the like and controls the operations of the LED head 2, the developing unit, conveying unit, transfer unit, fixing unit, and the like on the basis of the print data.

The LED head 2 comprises: an LED array 7 constructed by linearly arranging LED elements; a driving section that comprises LED driver IC 6 for driving the LED array 7 in accordance with the print data or the like from the print controller 1; and an EEPROM 8 in which correction data (or correction values) for correcting the drive output by the LED driver IC 6 is stored.

Figure 24:
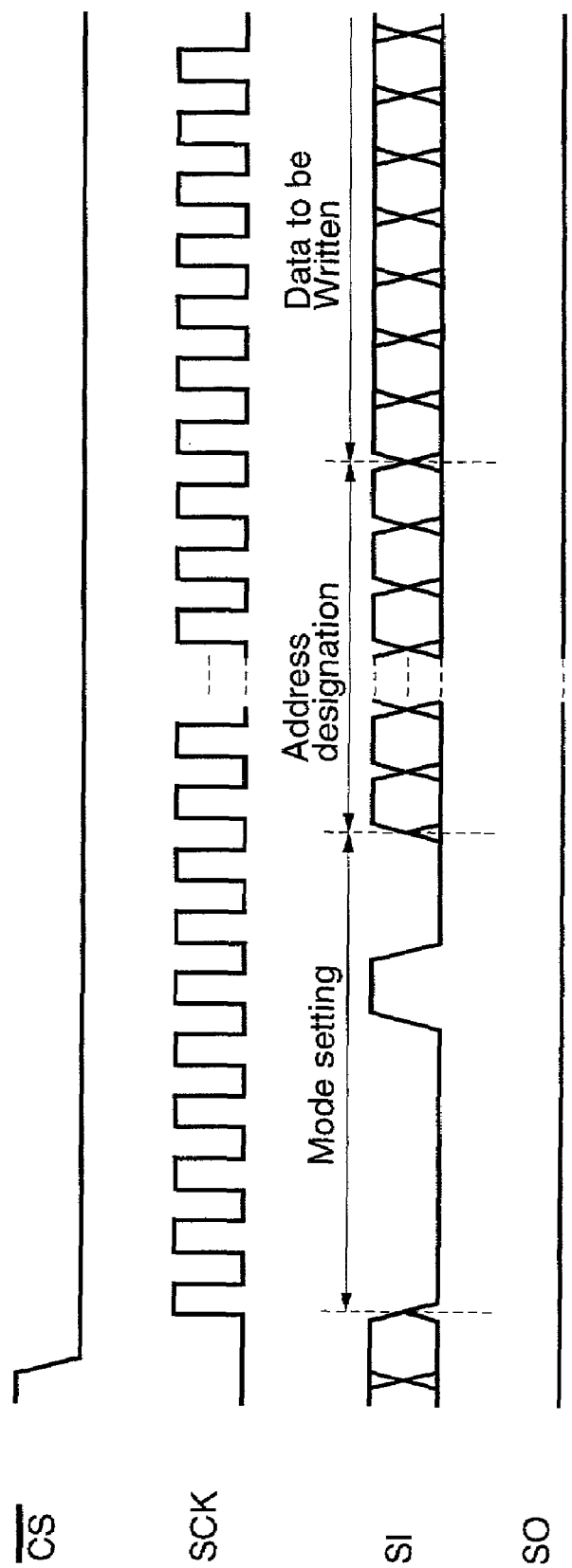
FIG. 24 is a time chart showing the writing operation into the EEPROM.
Figure 25:
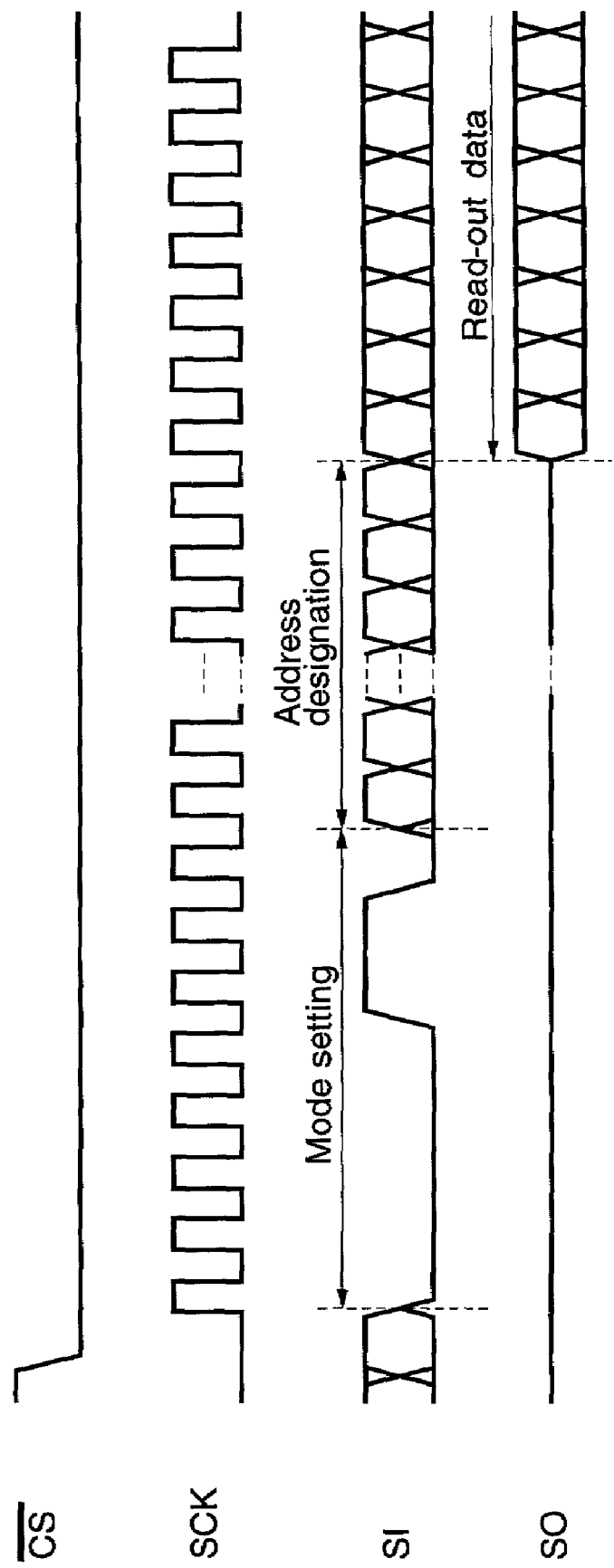
FIG. 25 is a time chart showing the reading operation from the EEPROM.

The EEPROM 8 is an EEPROM of what is called a serial access type similar to the conventional one. FIGS. 24 and 25 show time charts showing the writing operation and reading operation, respectively.

The EEPROM 8 has: the clock input (SCK) terminal for inputting the clock; the data signal input (SI) terminal for inputting the control signals and data signal; a data signal output (SO) terminal for outputting the data signal; and the chip selection (CS-N) terminal for inputting a chip selection signal.

Figure 2:
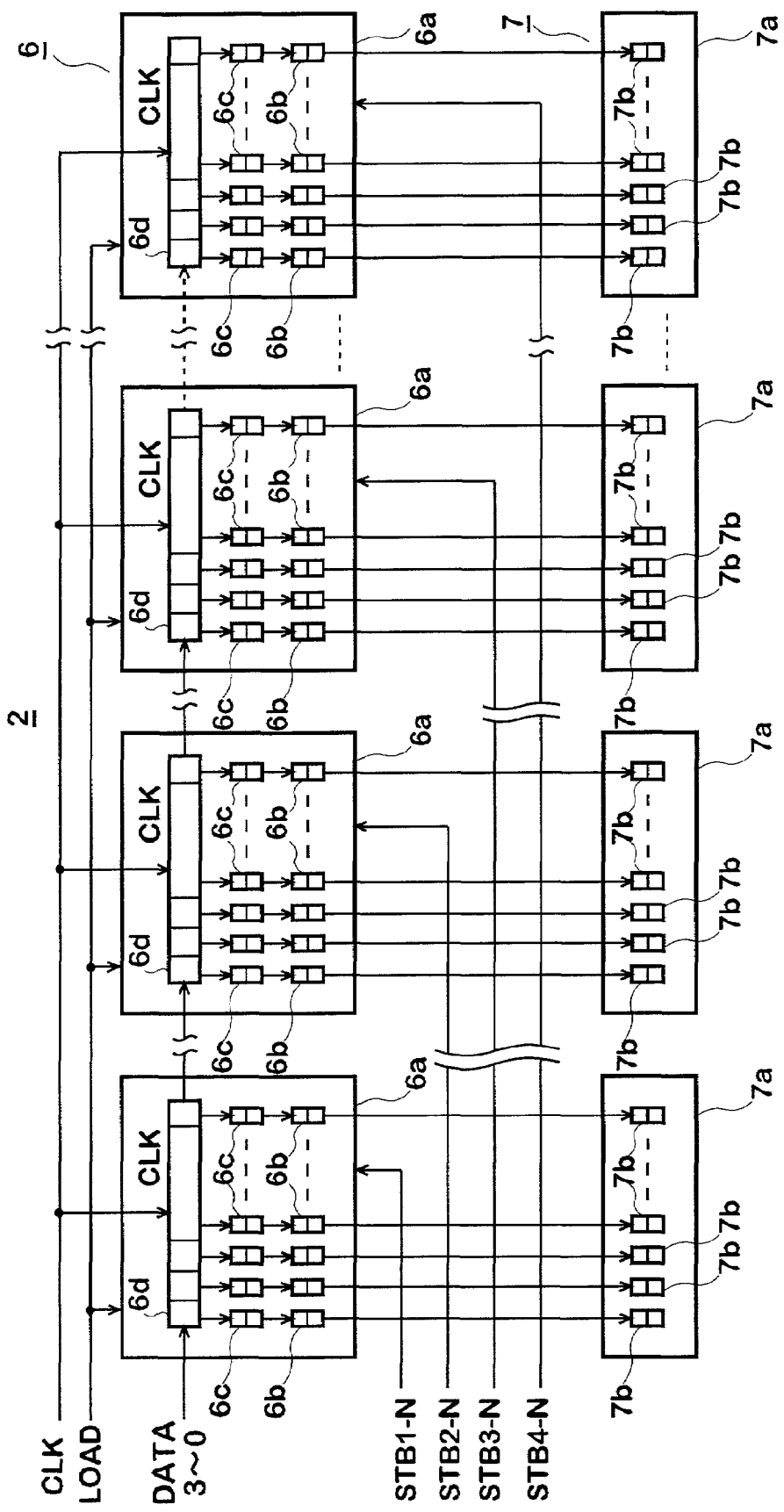
FIG. 2 is a block diagram showing control signals which are supplied to a LED driver IC constructing the electrophotographic printer.

FIG. 2 is a block diagram showing a more detailed construction of the LED driver IC 6 and LED array 7. The LED array group 7 has 2496 LED elements 7b which are, for example, linearly arranged. The LED elements 7b are installed as an LED array 7a, for example, every 96 elements. The LED array 7 is constructed by arranging 26 LED arrays 7a. The number of LED elements 7b, that is, 2496 corresponds to a width of the paper of the A4 size at a resolution of 300 dpi.

A driver IC 6a comprises: driving units 6b for driving the LED elements 7b in the LED array 7; holding units 6c each of which is constructed by a latch circuit or the like for holding the print data for driving each driving unit 6b, the correction data for correcting a drive output of the driving unit 6b, and the like; and a shift register 6d for sequentially transferring print data (DATA3 to DATA0) which is supplied to an input terminal in response to the clock (CLK) which is supplied to a clock terminal and supplying the print data to the holding units 6c in response to the load signal (LOAD).

The print data (DATA3 to DATA0) from the print controller 1 is supplied to the shift register 6d of the driver IC 6a at the first stage. An output of the shift register 6d is supplied to the shift register 6d of the driver IC 6a at the second stage. Further, an output of the shift register 6d of the driver IC 6a at the second stage is supplied to the shift register 6d of the driver IC 6a at the third stage. In a manner similar to the above, the shift register 6d of the driver IC 6a at the final stage (the 26th stage) is serially connected. Therefore, the shift registers 6d of all driver ICs 6a function as one shift register of a length corresponding to 2496 bits.

The driver ICs 6a in the LED driver IC 6 and the LED arrays 7a in the LED array 7 are divided into a plurality of groups for the purpose of suppression of a peak of the drive current and their operations are controlled on a group unit basis.

That is, the LED arrays 7a and driver ICs 6a of seven sets at the 1st to 7th stages construct the first group. The LED arrays 7a and driver ICs 6a of six sets at the 8th to 13th stages construct the second group. The LED arrays 7a and driver ICs 6a of six sets at the 14th to 19th stages construct the third group. The LED arrays 7a and driver ICs 6a of seven sets at the 20th to 26th stages construct the fourth group.

The strobe signals STB1-N to STB4-N are used for selecting the group to be made operative from those groups.

The strobe signal STB1-N is supplied to the driver IC 6a in the first group. The strobe signal STB2-N is supplied to the driver IC 6a in the second group. The strobe signal STB3-N is supplied to the driver IC 6a in the third group. The strobe signal STB4-N is supplied to the driver IC 6a in the fourth group.

When the storage of the correction data, the driving of the LED elements 7b, and the like are executed, the storage of the correction data, the driving of the LED elements, and the like are instructed every group in response to the strobe signals STB1-N to STB4-N.

The CPU 3 validates, for example, the strobe signal STB1-N for a predetermined period upon divisional driving or the like of the LED elements 7b. After the strobe signal STB1-N is invalidated, the CPU 3 validates the strobe signal STB2-N for a predetermined period. Similarly, the CPU 3 validates the remaining strobe signals STB3-N and STB4-N for a predetermined period. As mentioned above, the CPU 3 sequentially validates one of the strobe signals STB1-N to STB4-N.

Although the strobe signals STB1-N to STB4-N are used for designating one of the foregoing groups upon divisional driving or the like of the LED elements 7b, since there is no need to select the group in the other operations, those signals are not used.

In the other operations in which the selection of the group is unnecessary, therefore, even if the strobe signal lines for supplying the strobe signals are used for supplying the other signals, no trouble is caused in the selecting operation of the group.

In the electrophotographic printer, therefore, those strobe signal lines are used as signal lines for writing and reading out data into/from the EEPROM 8. Specifically speaking, the SCK terminal of the EEPROM 8 to input the clock is connected to the signal line for supplying the strobe signal STB1-N. The SI terminal to input the data or the like is connected to the signal line for supplying the strobe signal STB2-N. The SO terminal to output the data is connected to the signal line for supplying the strobe signal STB3-N. The CS-N terminal to input the chip selection signal is connected to the signal line for supplying the strobe signal STB4-N.

By sharing the signal lines as mentioned above, the separate dedicated wirings for supplying the correction data from the EEPROM 8 to the LED driver IC 6 are unnecessary and the number of wires can be reduced. Therefore, even if the LED light amount is corrected and the print quality is improved, an increase in costs can be suppressed. The invention can contribute to the reduction of the costs of the apparatus.

Since the control signal lines for the terminals (SCK, SI, SO, CS-N) of the EEPROM 8 are used in common with the strobe signal lines for supplying the strobe signals STB1-N to STB4-N, the EEPROM 8 can be provided in the print controller 1 or between the print controller 1 and LED head 2 in place of the example shown in FIG. 1 in which the EEPROM 8 is provided in the LED head 2.

The specific operation of the electrophotographic printer constructed as mentioned above will now be described hereinbelow. The electrophotographic printer executes the print according to the video signal SG2 from the foregoing upper controller, the correcting operation according to the light amount of each LED element, and the like.

Figure 3:
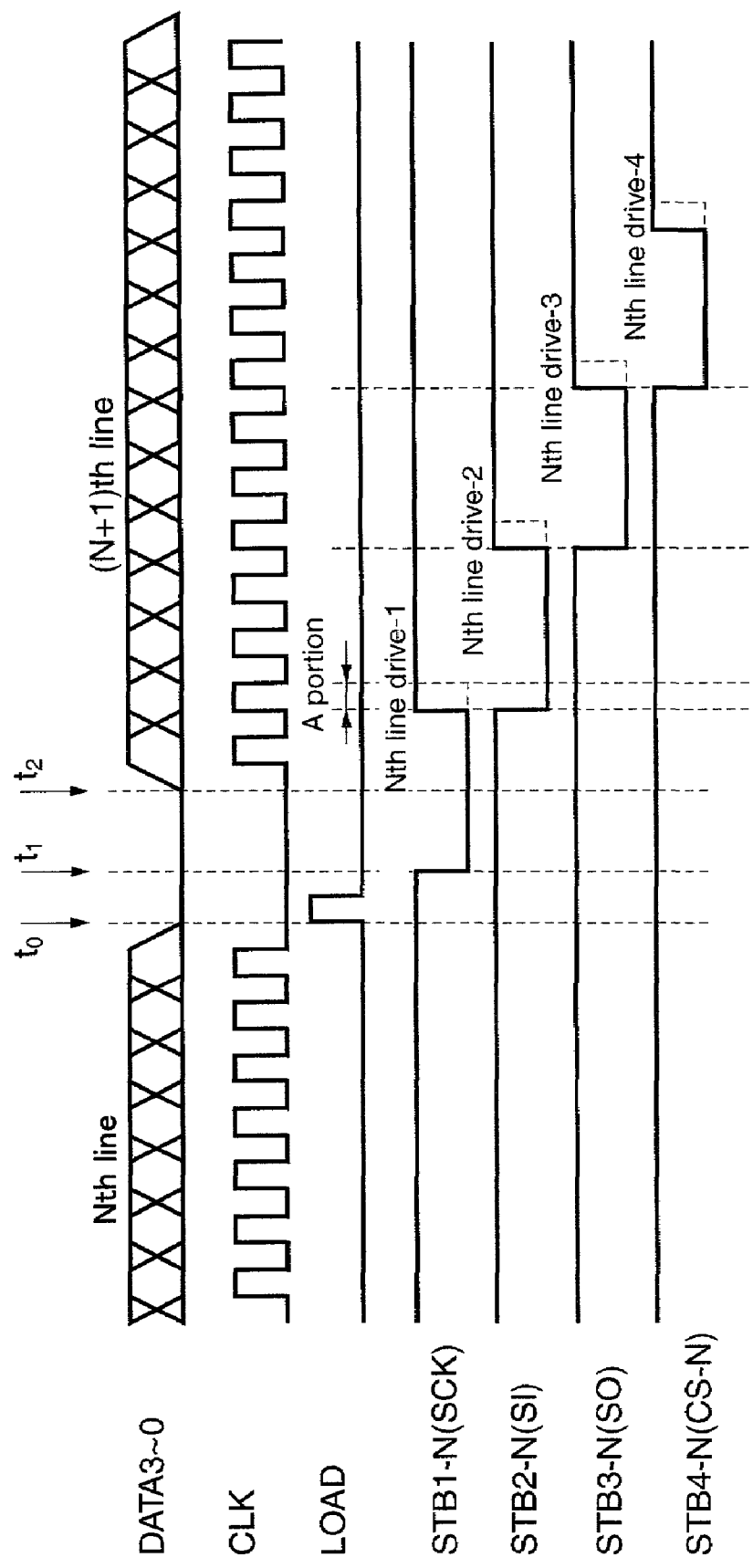
FIG. 3 is a time chart showing the printing operation of the electrophotographic printer.

When the print is instructed from the upper controller and the video signal SG2 is supplied by an amount corresponding to one line at a time, as shown in FIG. 3, the print controller 1 converts the video signal SG2 into the print data and sequentially supplies it as print data signals DATA3 to DATA0 to the LED head 2.

Specifically speaking, as shown in FIG. 3, the print controller 1 supplies a predetermined number of clocks CLK to the LED head 2 and sequentially supplies the print data signals DATA3 to DATA0 to the LED head 2 synchronously with the clock CLK.

The clock CLK is supplied in common to each driver IC 6a in FIG. 2 and the print data signals DATA3 to DATA0 are supplied to the shift register 6d of the driver IC 6a at the first stage. Therefore, the print data signals DATA3 to DATA0 are sequentially fetched in response to the clock CLK. The fetched print data is sequentially shifted to the shift register 6d at the post stage in response to the clock CLK.

When the print data is transferred to a predetermined position at time t0 in FIG. 3, the print controller 1 stops the supply of the clock CLK, sets the load signal LOAD to the high level for a predetermined period of time, and instructs the holding units 6c of each driver IC 6a to hold (latch) the print data held in the corresponding bits in the shift register 6d. Thus, the print data is held in the holding unit 6c at the position of the corresponding dot.

After that, the print controller 1 instructs the driving unit 6b to drive the LED elements 7b every group. Specifically speaking, as shown in FIG. 3, the print controller 1 first sets the strobe signal STB1-N to the low level for a predetermined period of time, so that the driving units 6b of the first group drive the corresponding LED elements 7b. After that, the print controller 1 sequentially sets the strobe signals STB2-N to STB4-N to the low level for a predetermined period of time and instructs the driving units 6b of the second to fourth groups to drive the LED elements 7b. Thus, the LED elements 7b of each group are sequentially driven and an electrostatic latent image of one line is formed on the photosensitive drum.

By repeating such an operation every print data of one line which is supplied from the upper controller, an electrostatic latent image corresponding to one sheet of image is formed on the photosensitive drum. After that, the electrostatic latent image is developed by toner. A toner image formed by the development is transferred onto the recording medium such as a paper or the like. The toner image and the paper are pressed while the heat is applied thereto, thereby fixing the toner image onto the paper.

In addition to the print data as mentioned above, the correction data according to the light amount of the LED element 7b is also held in each holding unit 6c. Each driving unit 6b corrects a drive output for driving the LED element 7b in accordance with the correction data.

To supply the correction data to each holding unit 6c, the print controller 1 reads out the correction data stored in the EEPROM 8 and supplies it to the corresponding holding unit 6c by the transfer by the shift register 6d similar to that of the print data mentioned above.

Those operations will now be described hereinbelow. There are the variations as mentioned above in the LED elements 7b in each LED array 7a or in the LED light amounts between the LED arrays 7a. In the electrophotographic printer, the light amount of each LED element 7b is previously measured upon manufacturing, the correction data according to the light amount is obtained every LED element 7b, and each correction data is stored in the EEPROM 8. Specifically speaking, the correction data is held as data as shown in FIG. 22. For example, when a power source of the electrophotographic printer is turned on, the print controller 1 reads out the data from the EEPROM 8 and transfers it to the holding unit 6c in each driver IC 6a, thereby setting.

Figure 4:
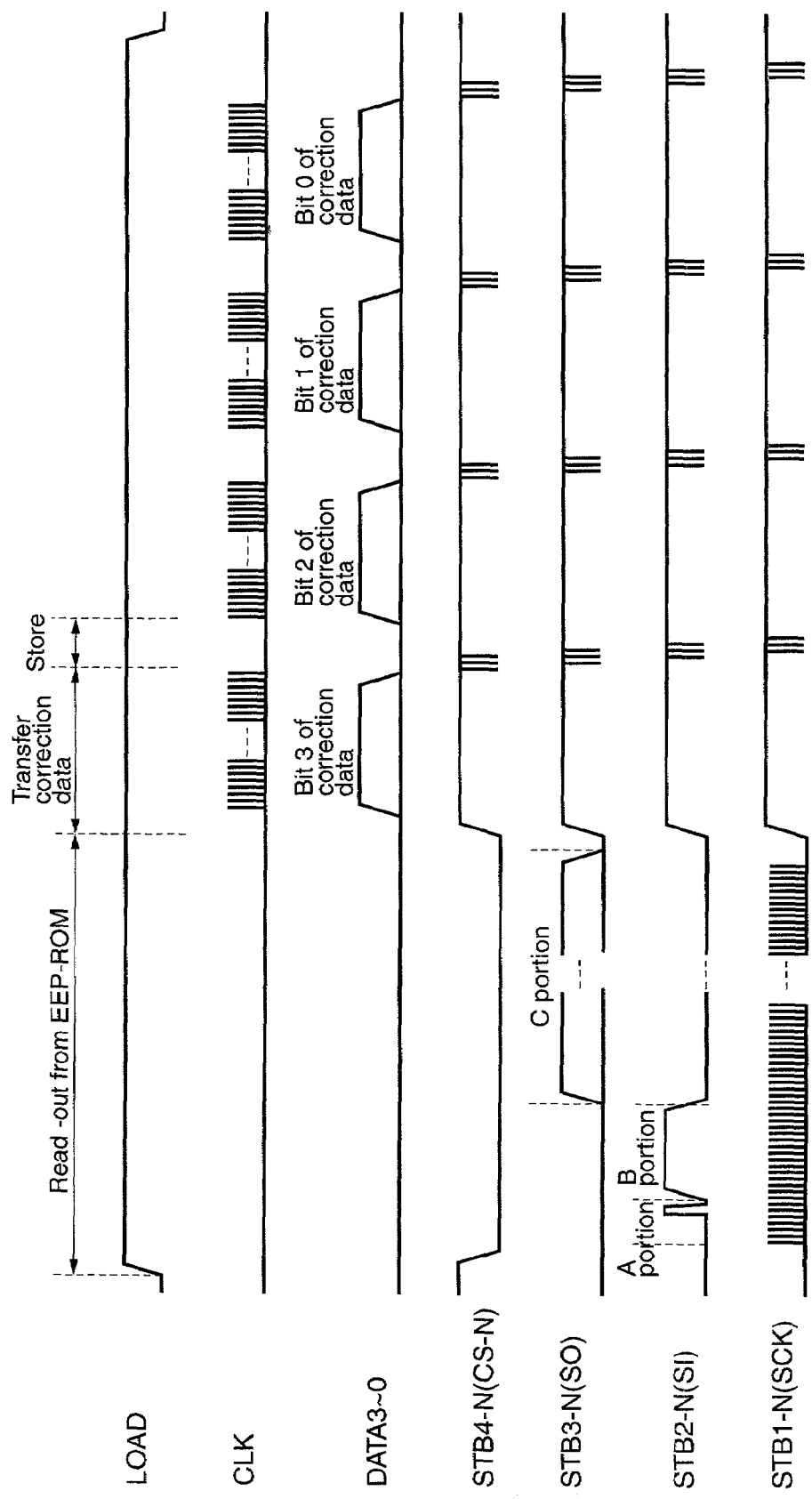
FIG. 4 is a time chart showing the setting operation of correction data in the electrophotographic printer.

FIG. 4 is a time chart showing the setting operation of such correction data.

When the correction data is set, the print controller 1 reads out the correction data from the EEPROM 8 and supplies the correction data to the LED driver IC 6.

When the correction data is read out from the EEPROM 8, the print controller 1 first sets the load signal LOAD to the high level and sets the strobe signal STB4-N supplied to the CS-N terminal of the EEPROM 8 to the low level. Thus, the EEPROM 8 enters an operable mode.

In an A portion in FIG. 4, the print controller 1 outputs a clock of a predetermined period to the strobe signal line STB1-N connected to the SCK terminal of the EEPROM 8 and outputs data for setting the EEPROM 8 into the reading mode to the strobe signal line STB2-N synchronously with the clock.

When the clock is supplied to the SCK terminal, in response to this clock, the EEPROM 8 fetches the data which is supplied to the SI terminal through the strobe signal line STB2-N, namely, the data for setting the EEPROM 8 into the reading mode. When such data is fetched, a mode setting unit (not shown) in the EEPROM 8 sets the operating mode of the EEPROM 8 to the reading mode in accordance with the fetched data.

After that, in a B portion in FIG. 4, the print controller 1 outputs a clock of a predetermined period to the strobe signal line STB1-N and outputs a read start address from the EEPROM 8 to the strobe signal line STB2-N synchronously with the clock.

The EEPROM 8 fetches the read start address supplied in accordance with the clock and holds it into an address counter or the like (not shown).

Further, in a C portion in FIG. 4, when the print controller 1 continues the output of the clock of the predetermined period to the strobe signal line STB1-N, the EEPROM 8 sequentially reads out a predetermined number of data (correction data) in the read start address and subsequent addresses synchronously with the clock and outputs the read-out correction data to the SO terminal.

As shown in FIG. 22, since the correction data has been collectively stored in the EEPROM 8 every bit in arranging order of the dots, the correction data is outputted to the strobe signal line STB3-N through the SO terminal in accordance with this order. The print controller 1 sequentially fetches the correction data read out to the strobe signal line STB3-N and stores into the RAM 4. In this manner, the reading operation of the correction data from the EEPROM 8 is finished.

The correction data comprises, for example, data of 4 bits (bit 3, bit 2, bit 1, bit 0) per dot.

On the other hand, since the print data signal lines (DATA3 to DATA0) used for supplying the correction data correspond to, for example, one bit, the print controller 1 supplies the data of bit 3 of each dot from the RAM 4 to each holding unit 6*c* in the LED driver IC 6 and, thereafter, sequentially supplies the data of bit 2, bit 1, and bit 0 to each holding unit 6*c*.

Specifically speaking, as shown in the latter half of FIG. 4, first, the data of bit 3 of the correction data is outputted to the DATA signal line. Until the correction data of each dot reaches the corresponding shift register 6*d*, the clock signals of the necessary number are supplied to the LED driver IC 6.

After the correction data reached the corresponding shift register 6*d* from the RAM 4, the print controller 1 supplies three negative pulses of predetermined widths having a predetermined phase relation as strobe signals STB4-N to STB1-N as shown in FIG. 4.

Figure 5:
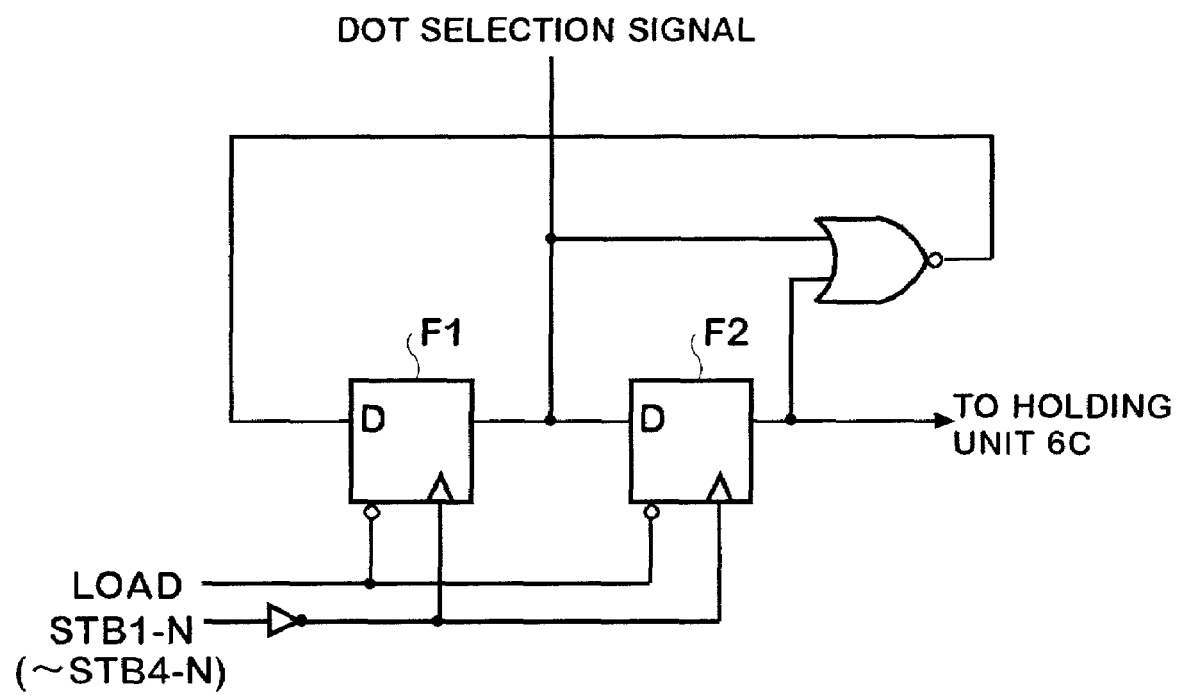
FIG. 5 is a diagram showing a construction of a main section of a control signal generator provided for a driver IC of an LED head 2 constructing the electrophotographic printer.

Each driver IC 6*a* has an operation control unit for generating control signals of the internal operation from the corresponding strobe signal STB1-N (to STB4-N). For example, as shown in FIG. 5, the operation control unit has a counter having flip-flops F1 and F2 every bit (bit 3 to bit 0). When three negative pulses of a predetermined width as mentioned above are supplied, the operation control unit instructs the holding units 6*c* to hold the correction data at a predetermined timing (for example, at the second clock). Thus, the correction data of bit 3 is held in the holding units 6*c* of each driver IC 6*a*.

By repeating the above operation with respect to remaining bit 2, bit 1, and bit 0, the correction data of four bits for each dot is held in the holding units 6*c* in each driver IC 6*a*.

Figure 6:
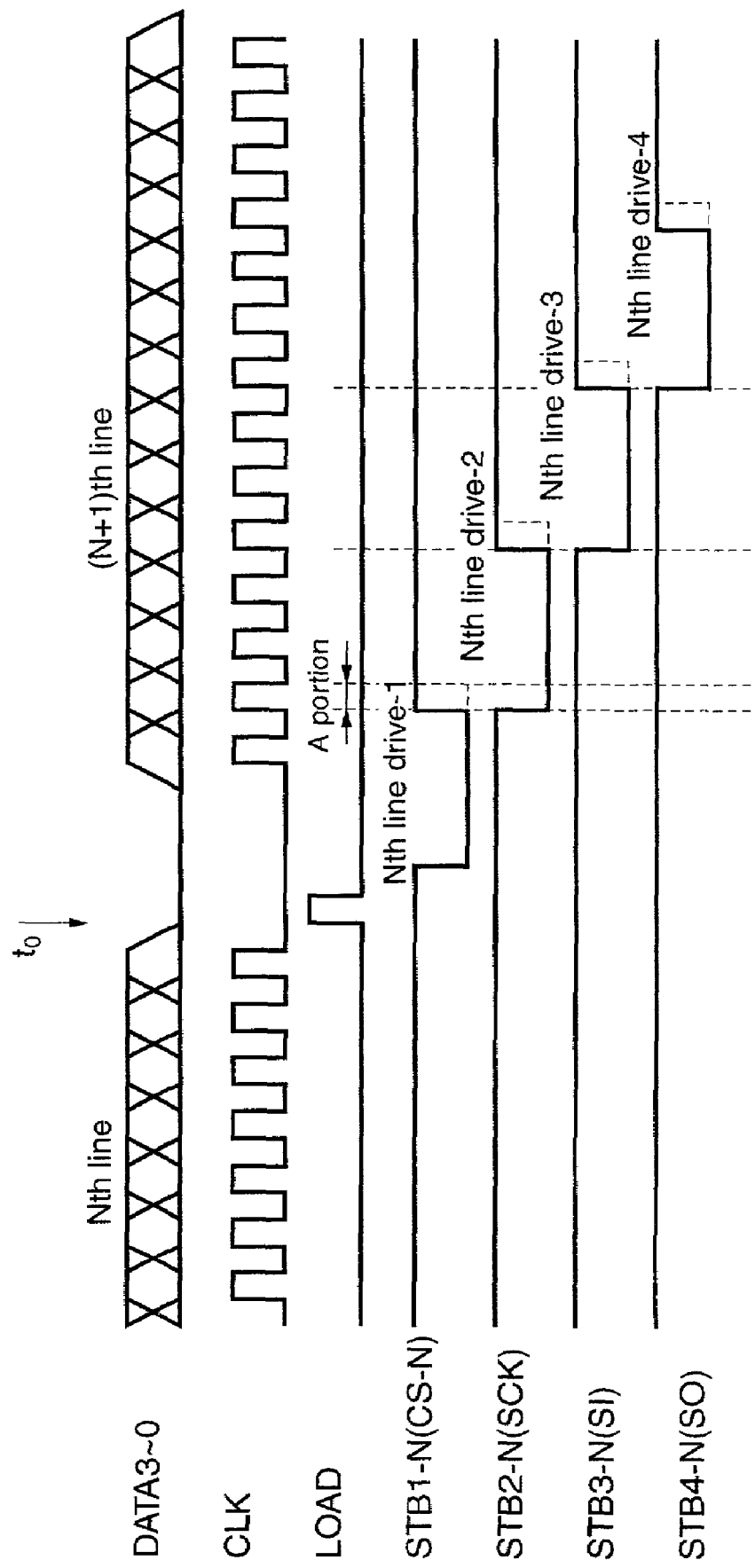
FIG. 6 is a time chart showing the printing operation of an electrophotographic printer of another construction.

To share transmission paths of the strobe signals STB1-N to STB4-N and the control signals for the EEPROM 8, as shown in FIG. 6, the CS-N terminal of the EEPROM 8 can be connected to the strobe signal line STB1-N, the SCK terminal can be connected to the strobe signal line STB2-N, the SI terminal can be connected to the strobe signal line STB3-N, and the SO terminal can be connected to the strobe signal line STB4-N, respectively.

Figure 18:
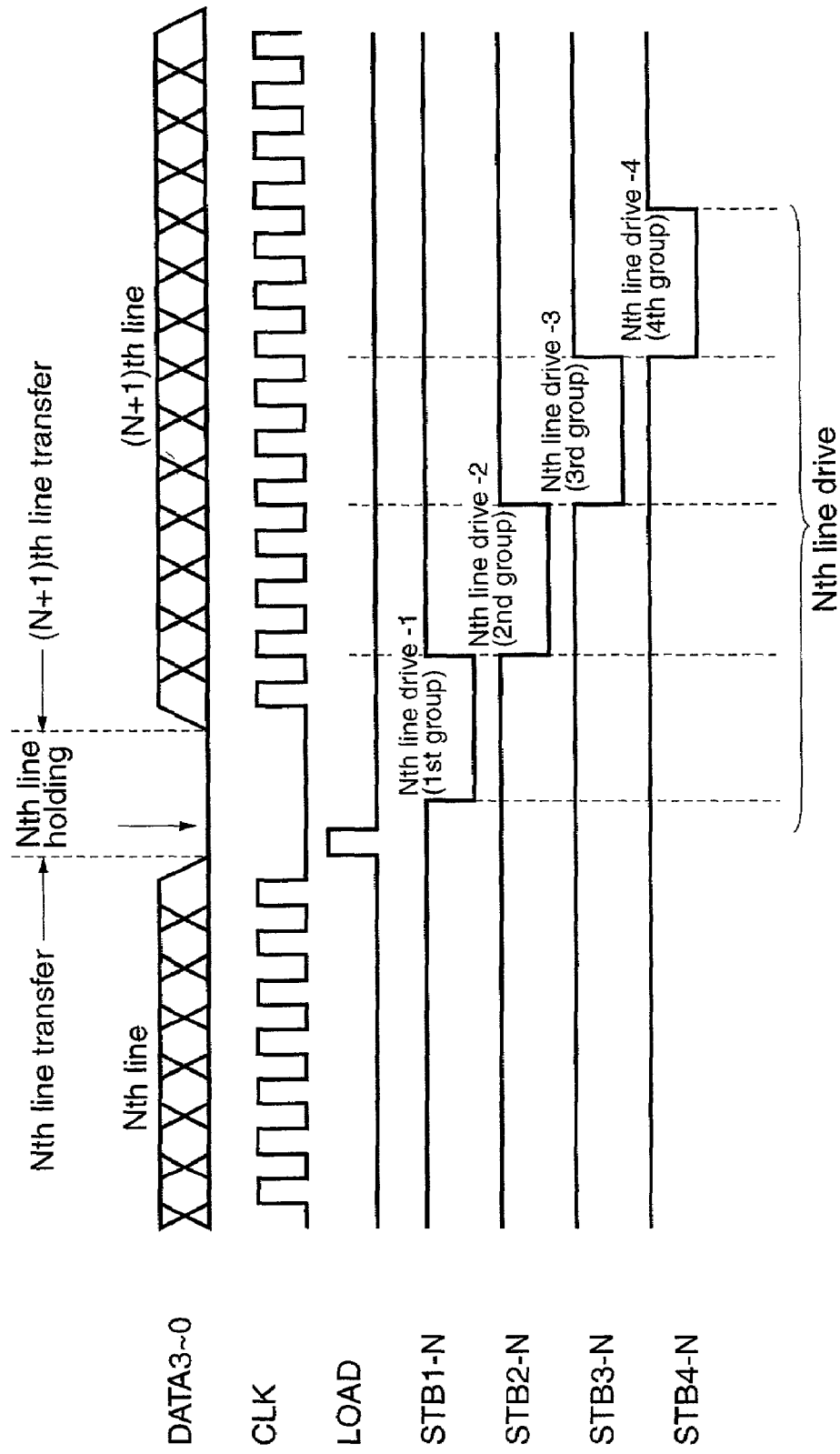
FIG. 18 is a time chart showing the details of the printing operation of the conventional electrophotographic printer.
Figure 19:
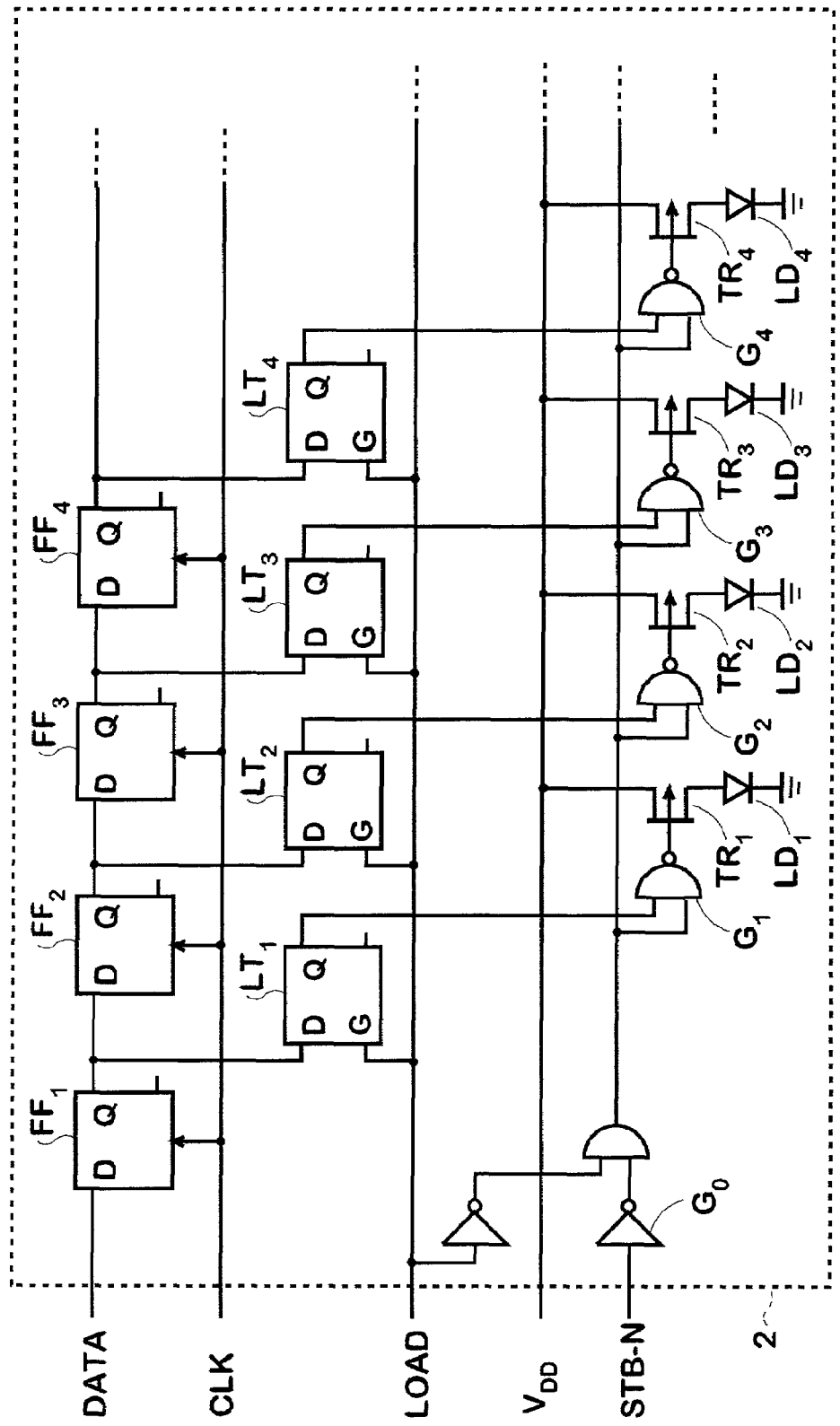
FIG. 19 is a digram showing a more detailed structure of a conventional LED head.

Upon printing operation, as shown in FIG. 18 mentioned above, the strobe signals STB1-N to STB4-N sequentially change. However, if the signals are delayed due to an influence of a wiring capacity or the like, there is a case where the change of a certain strobe signal (for example, STB2-N) is overlapped with the change of another strobe signal (for example, STB1-N) which changes before and after such a signal.

Therefore, in the case where the EEPROM 8 is connected as shown in FIG. 6, in an A portion in FIG. 6, when a voltage at the CS-N terminal connected to the strobe signal line STB1-N is at the low level at which the EEPROM 8 can operate, if the SCK terminal connected to the strobe signal line STB2-N is set to the low level, the EEPROM 8 which must not operate upon printing operation performs an erroneous operation such as writing, reading, or the like of the data in response to the signal of each strobe signal line upon printing operation.

On the other hand, in the case where the EEPROM 8 is connected as shown in FIG. 1, as shown in an A portion in FIG. 3, even if the strobe signal is overlapped with another strobe signal upon printing operation, a situation such that the voltage at the SCK terminal changes when the CS-N terminal is at the low level can be prevented. Since the possibility of the erroneous operation of the EEPROM 8 upon printing operation can be reduced, the reliability is further improved as compared with that in the example shown in FIG. 6.

If it is sufficient to prevent a situation such that the voltage at the SCK terminal changes when the voltage at the CS-N terminal is at the low level, it is sufficient to connect those terminals in a manner such that at least one strobe signal which changes exists between the strobe signal which is supplied to the SCK terminal and the strobe signal which is supplied to the CS-N terminal. Therefore, the connection between the terminals SCK, SI, SO, and CS-N of the EEPROM 8 and the strobe signal lines STB1-N, STB2-N, STB3-N, and STB4-N is not always necessary to be identical to that shown in FIG. 1.

Figure 21:
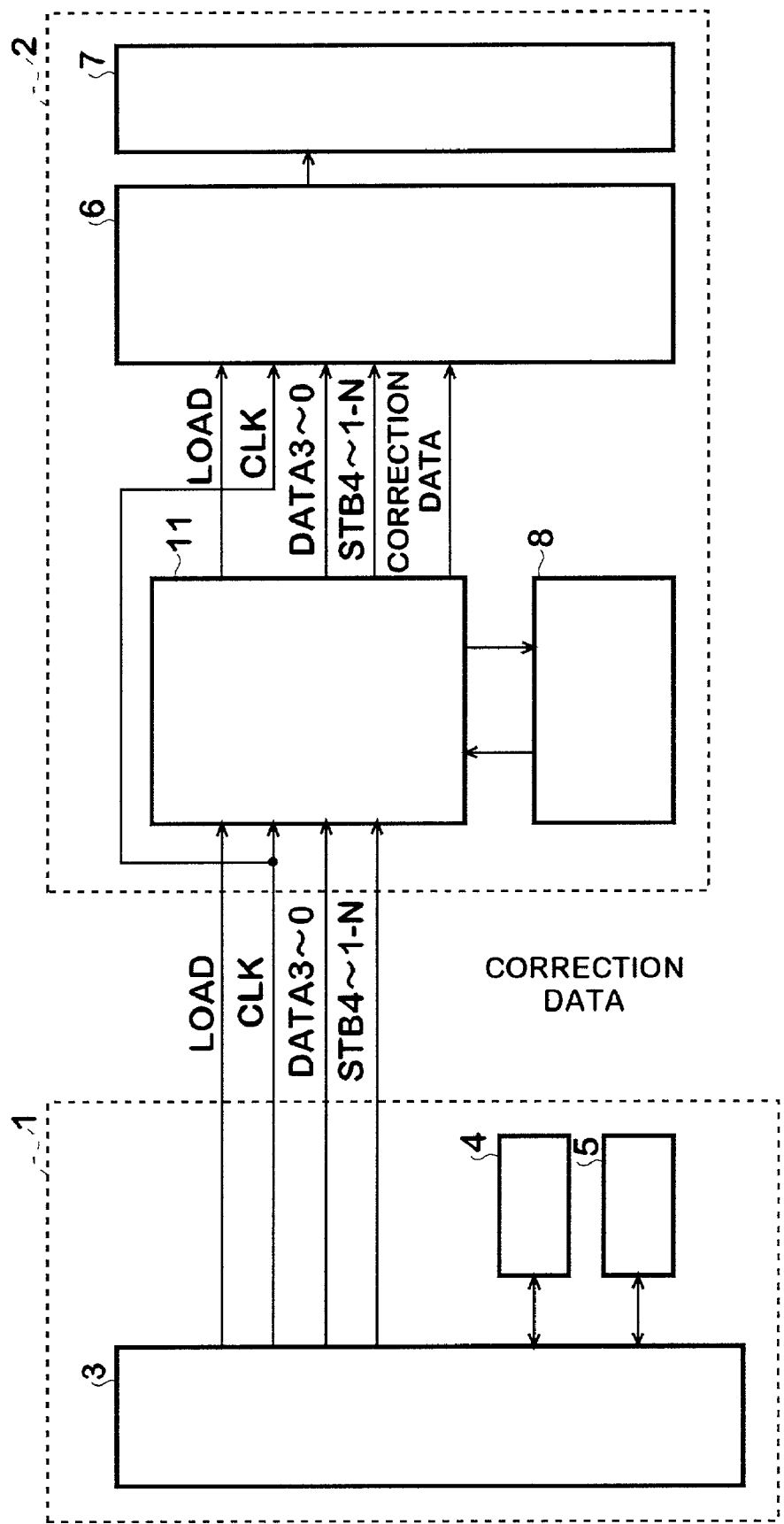
FIG. 21 is a block diagram showing a construction of the LED head and a print controller constructing the conventional electrophotographic printer.

In the conventional electrophotographic printer, as shown in FIG. 21 mentioned above, since the correcting operation control IC 11 controls the reading operation of the correction data which is supplied to the LED driver IC 6 on the basis of the internal clock SCK, the timing of the correction data is delayed from the clock CLK generated separately from the CPU 3. Therefore, if the apparatus is constructed so that the LED driver IC 6 fetches the correction data from the EEPROM 8 in response to the clock CLK, there is a possibility that the apparatus erroneously operates in case of realizing a high operating speed. To improve the certainty of the operation, it is necessary to lower a transfer speed of the correction data.

On the other hand, in the electrophotographic printer according to the invention, since the CPU 3 directly supplies the clock and the correction data to the LED driver IC 6 through the strobe signal lines STB1-N to STB4-N, the deviation of the timings between the clock and the correction data is eliminated. Therefore, it is possible to improve the reliability of supply of the correction data to the LED driver IC 6.

Since the deviation between the clock and the correction data is eliminated, even if the operating speed is raised, the certainty of the operation does not deteriorate comparatively, so that a design margin such as a change of the timing or the like which conventionally became an obstacle to realization of the high speed can be reduced. It is possible to contribute to the realization of a high speed. Thus, for example, the transfer speed of the data for the LED head 2 can be raised to a limit of the data transfer speed between the CPU 3 and the LED head 2.

Figure 7:
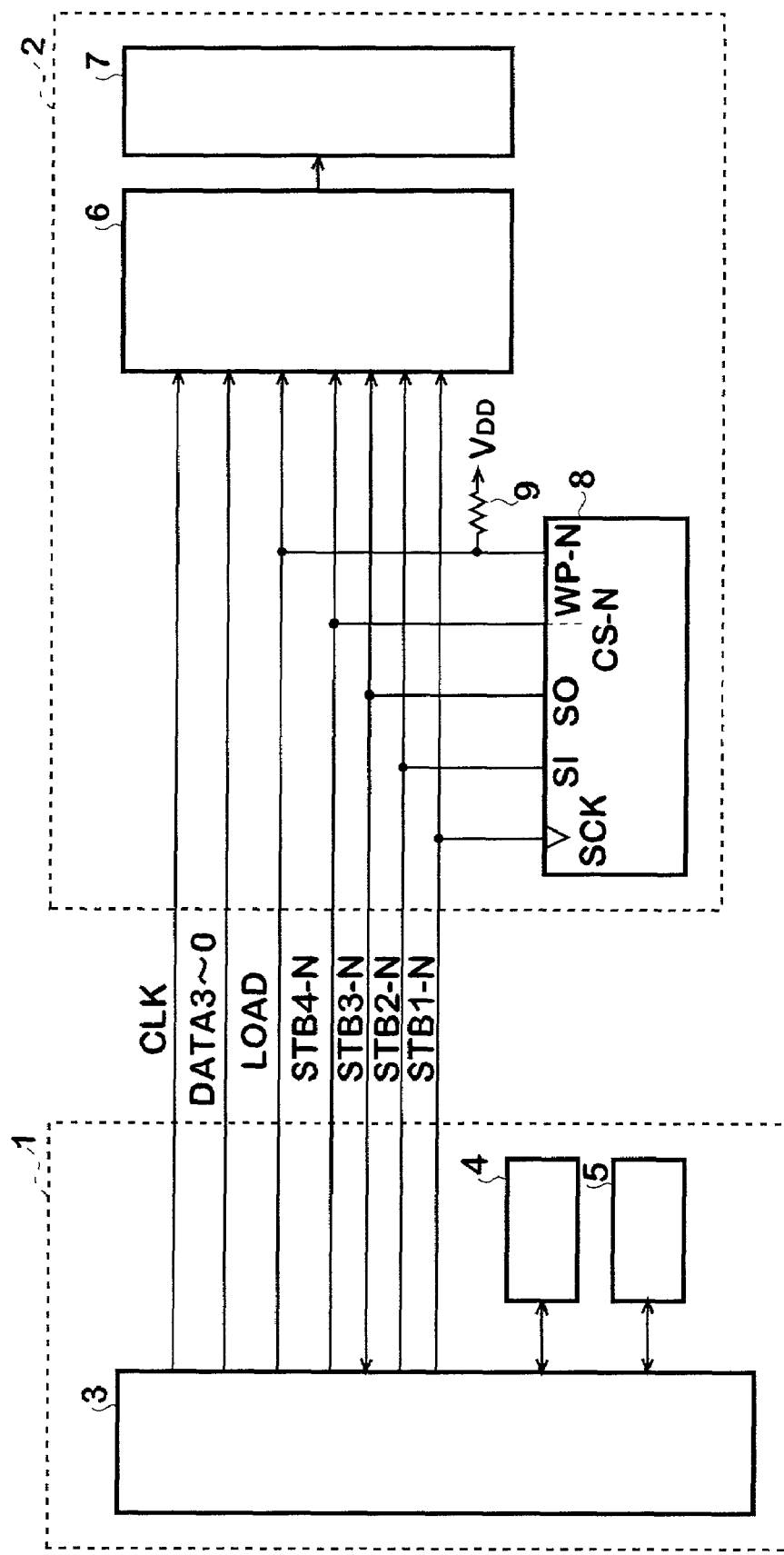
FIG. 7 is a block diagram showing a construction of an electrophotographic printer according to the second embodiment of the invention.

FIG. 7 is a block diagram showing a construction of a main section of an electrophotographic printer according to the second embodiment of the invention. As shown in FIG. 7, the electrophotographic printer according to the second embodiment is constructed in a manner similar to that in the first embodiment mentioned above. In the electrophotographic printer according to the first embodiment, the EEPROM 8 having the SCK terminal, SI terminal, SO terminal, and CS-N terminal has been used as an EEPROM 8. However, in the electrophotographic printer according to the second embodiment, as shown in FIG. 6, the EEPROM 8 further has a write inhibit signal input terminal (WP-N) for inputting a write inhibit signal.

In the EEPROM 8, the writing operation is inhibited when a voltage at the WP-N terminal is at the low level and the writing operation is permitted when the voltage is at the high level.

The WP-N terminal is connected to the signal line to which the load signal LOAD is supplied and, further, pulled up to the power voltage $V_{DD}$ by a resistor 9.

In the printing operation shown in FIG. 3, the load signal LOAD which is supplied to the WP-N terminal is set to the low level for a period of time other than the timing when the print controller 1 instucts each holding unit 6c to hold the correction data. At a timing when the load signal LOAD is at the high level, the voltage of the strobe signal line STB4-N to which the CS-N terminal is connected is at the high level. Therefore, in the printing operation, the EEPROM 8 is in a write inhibiting state.

Since the control signal lines to the terminals (SCK, SI, SO, CS-N) of the EEPROM 8 are shared with the strobe signal lines for supplying the strobe signals STB1-N to STB4-N, the EEPROM 8 can be provided in the print controller 1 or between the print controller 1 and the LED head 2 in place of the example of FIG. 7 in which the EEPROM 8 is provided in the LED head 2.

Figure 8:
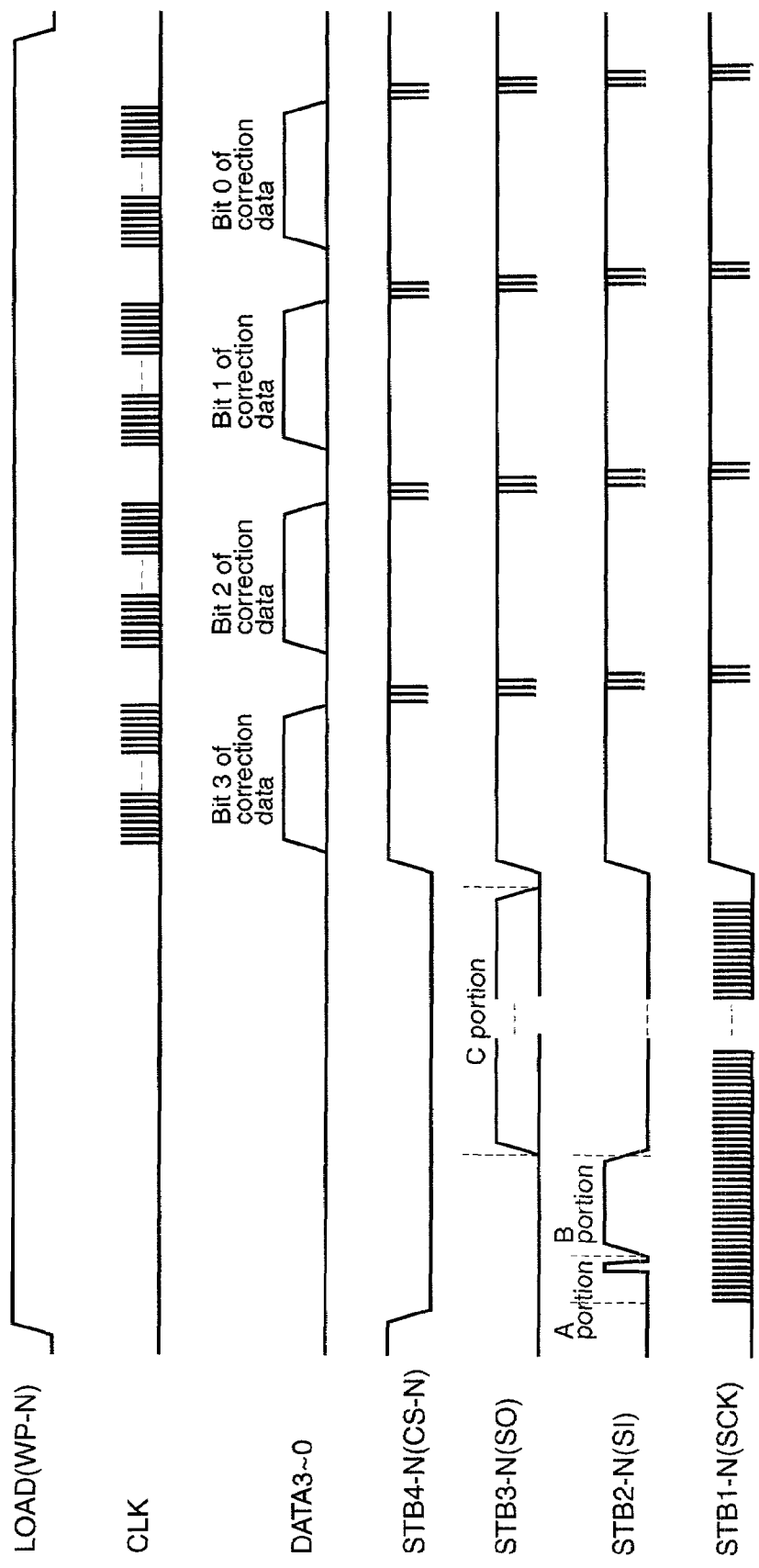
FIG. 8 is a time chart showing the setting operation of correction data in the electrophotographic printer.

FIG. 8 is a time chart showing the setting operation of the correction data in the electrophotographic printer constructed as mentioned above, that is, the reading operation of the correction data from the EEPROM 8 and the transfer operation of the correction data to the holding units 6c in each driver IC 6a.

When the correction data is set, the print controller 1 first sets the LOAD signal to the high level. Thus, the voltage at the WP-N terminal of the EEPROM 8 is also set to the high level and the EEPROM 8 is set into the writable state.

In an A portion in FIG. 8, in a manner similar to the operation in the A portion in FIG. 4 mentioned above, the print controller 1 subsequently outputs the clock of a predetermined period to the strobe signal line STB1-N and outputs the data for setting the EEPROM 8 into the reading mode to the strobe signal line STB2-N. Thus, the EEPROM 8 is set to the reading mode.

In a B portion in FIG. 8, in a manner similar to the operation in the B portion in FIG. 4 mentioned above, the print controller 1 subsequently outputs the clock of a predetermined period to the strobe signal line STB1-N and outputs the read start address to the strobe signal line STB2-N. Thus, the EEPROM 8 fetches the read start address.

Further, in a C portion in FIG. 8, in a manner similar to the operation in the C portion in FIG. 4 mentioned above, the print controller 1 outputs the clock of a predetermined period until a predetermined number of data is read out. Thus, a predetermined number of data (correction data) in the read start address and subsequent addresses is outputted from the EEPROM 8 to the strobe signal line STB3-N and supplied to the RAM 4 of the print controller 1.

When the reading of the correction data is finished, in a manner similar to the operation of the portion at the post stage in FIG. 8, the print controller 1 supplies the correction data from the RAM 14 to each driver IC 6a of the LED driver IC 6.

After the supply of the data is finished, the print controller 1 sets the load signal LOAD to the low level. Thus, the EEPROM 8 is set to a write inhibiting state.

According to the electrophotographic printer of the second embodiment as mentioned above, in the printing operation in which there is no need to perform the writing and reading operations to/from the EEPROM 8, since the load signal LOAD from the print controller 1 is held at the low level, the EEPROM 8 is held in the write inhibiting state. Therefore, the certainty of prevention of the erroneous writing to the EEPROM 8 is improved and it is possible to contribute to the improvement of the reliability.

Figure 9:
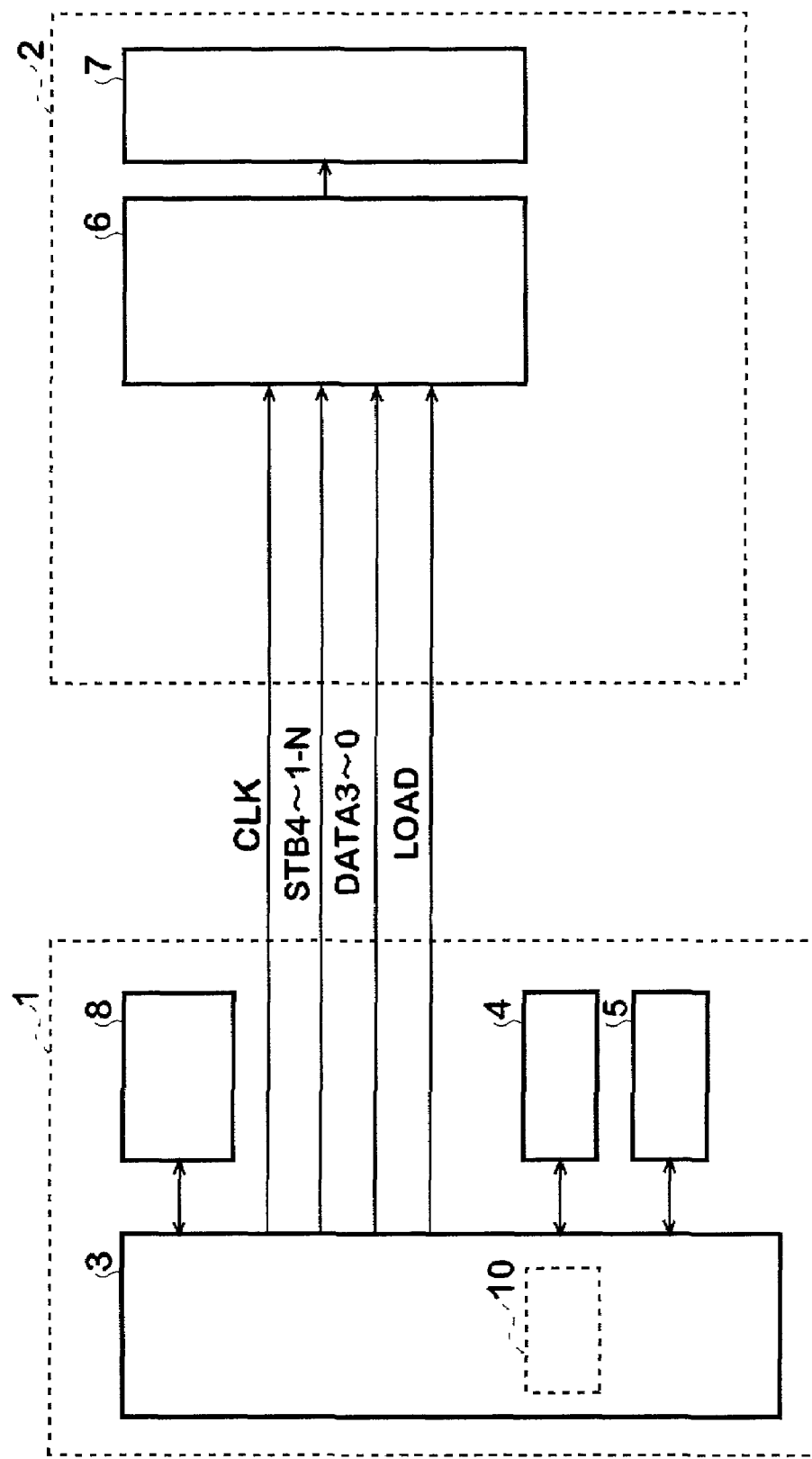
FIG. 9 is a block diagram showing a construction of an electrophotographic printer according to the third embodiment of the invention.
Figure 10:
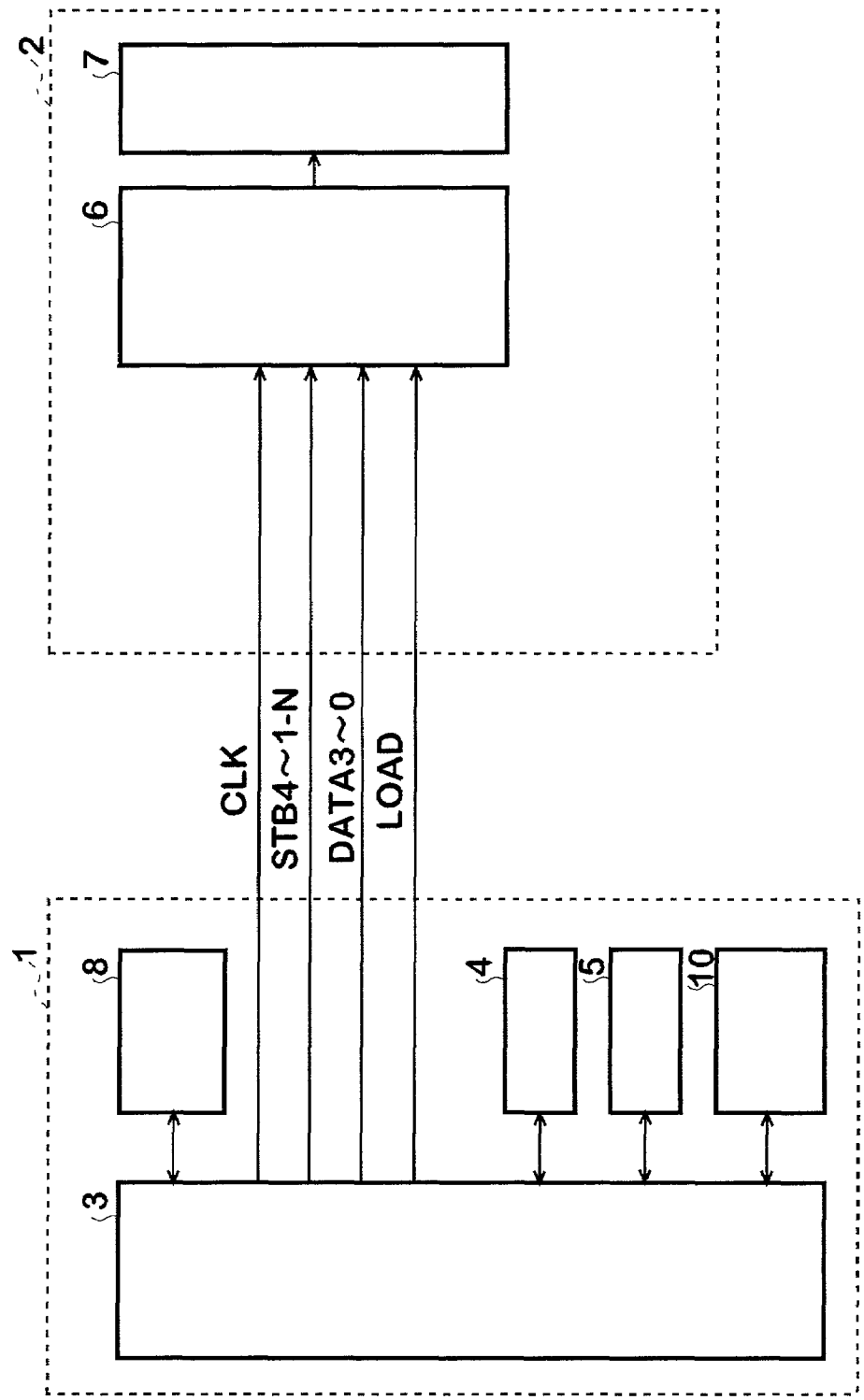
FIG. 10 is a block diagram showing a constructional example of an electrophotographic printer according to the fourth embodiment of the invention.

FIGS. 9 and 10 are block diagrams showing constructions of main sections of electrophotographic printers according to the third and fourth embodiments of the invention. Although the electrophotographic printers according to those embodiments are fundamentally constructed in a manner similar to the foregoing electrophotographic printer of the first embodiment shown in FIG. 7, in the third embodiment, the EEPROM 8 is provided in the print controller 1 unlike the first embodiment. Although not shown in FIGS. 9 and 10, the signal lines for performing the writing and reading operations into/from the EEPROM 8 are shared with the strobe signal lines (STB1-N to STB4-N) in a manner similar to the first and second embodiments mentioned above.

Although the correction data is stored as it is into the EEPROM 8 in the above first embodiment, each of the electrophotographic printers in the third and fourth embodiments has a compressor/decompressor 10 for compressing and decompressing the correction data.

The third embodiment shown in FIG. 9 relates to an example in which the compressor/decompressor 10 is installed in the CPU 3. The fourth embodiment shown in FIG. 10 relates to an example in which the compressor/decompressor 10 is installed outside the CPU 3.

Each of the compressor/decompressors 10 compresses the correction data by an entropy encoding such as LZ77 or the like when the correction data is stored. Each of the compressor/decompressors 10 decompresses the correction data read out from the EEPROM 8 when the correction data is set.

Figure 20:
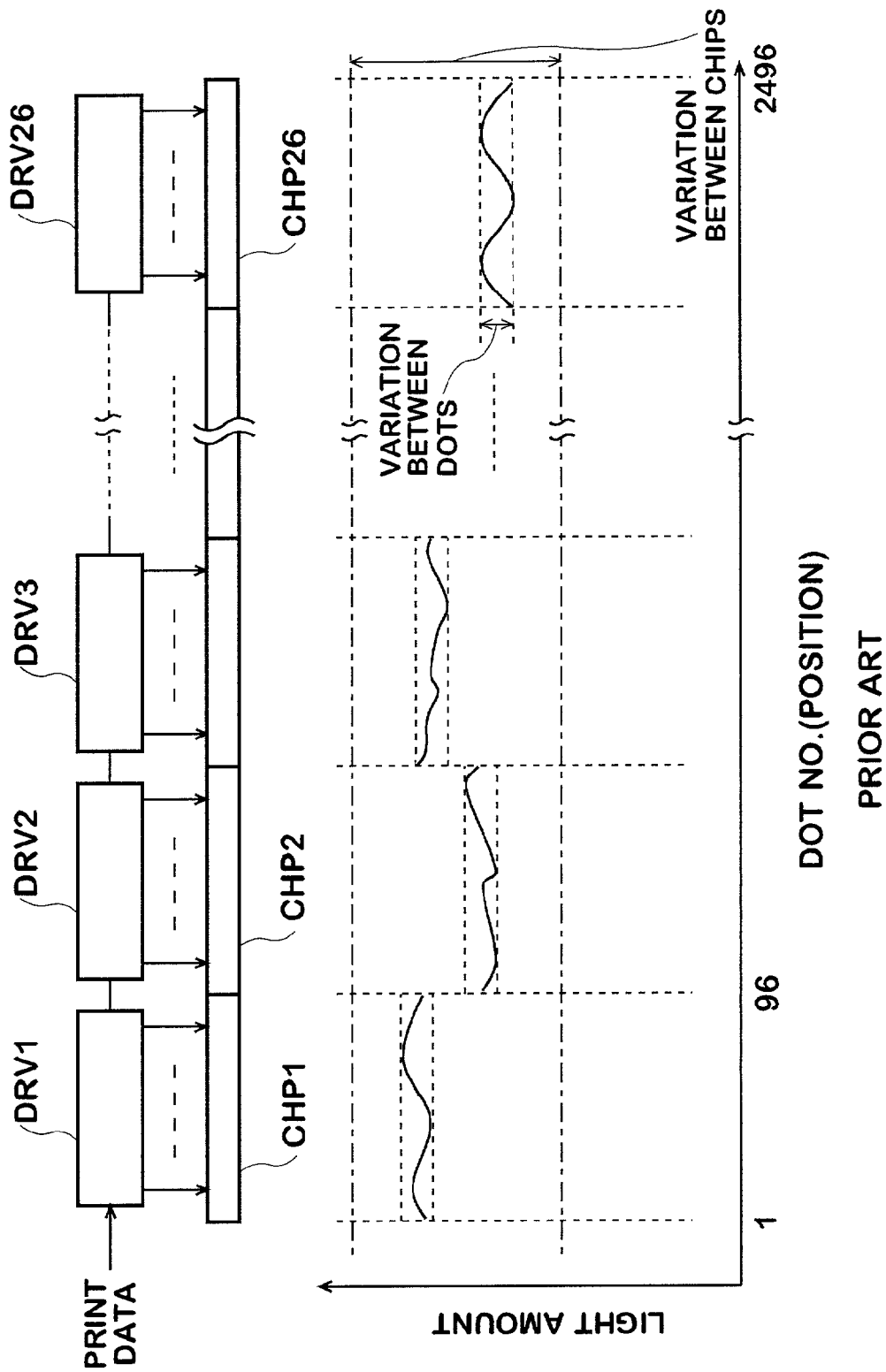
FIG. 20 is a diagram showing a construction of the LED head and a variation of a light amount of each dot of the head.

As shown in FIG. 20, as for the variation of the light emission amounts of the LED elements 7b, a change in light emission amount between the adjacent LED elements 7b is smaller than that between the LED elements 7b between the different LED arrays 7a. As shown in FIG. 22, since the correction data has been stored every bit of the light amount correction data of each dot, in many cases, the data of the same pattern repetitively appears in the correction data.

Figures 11, 12:
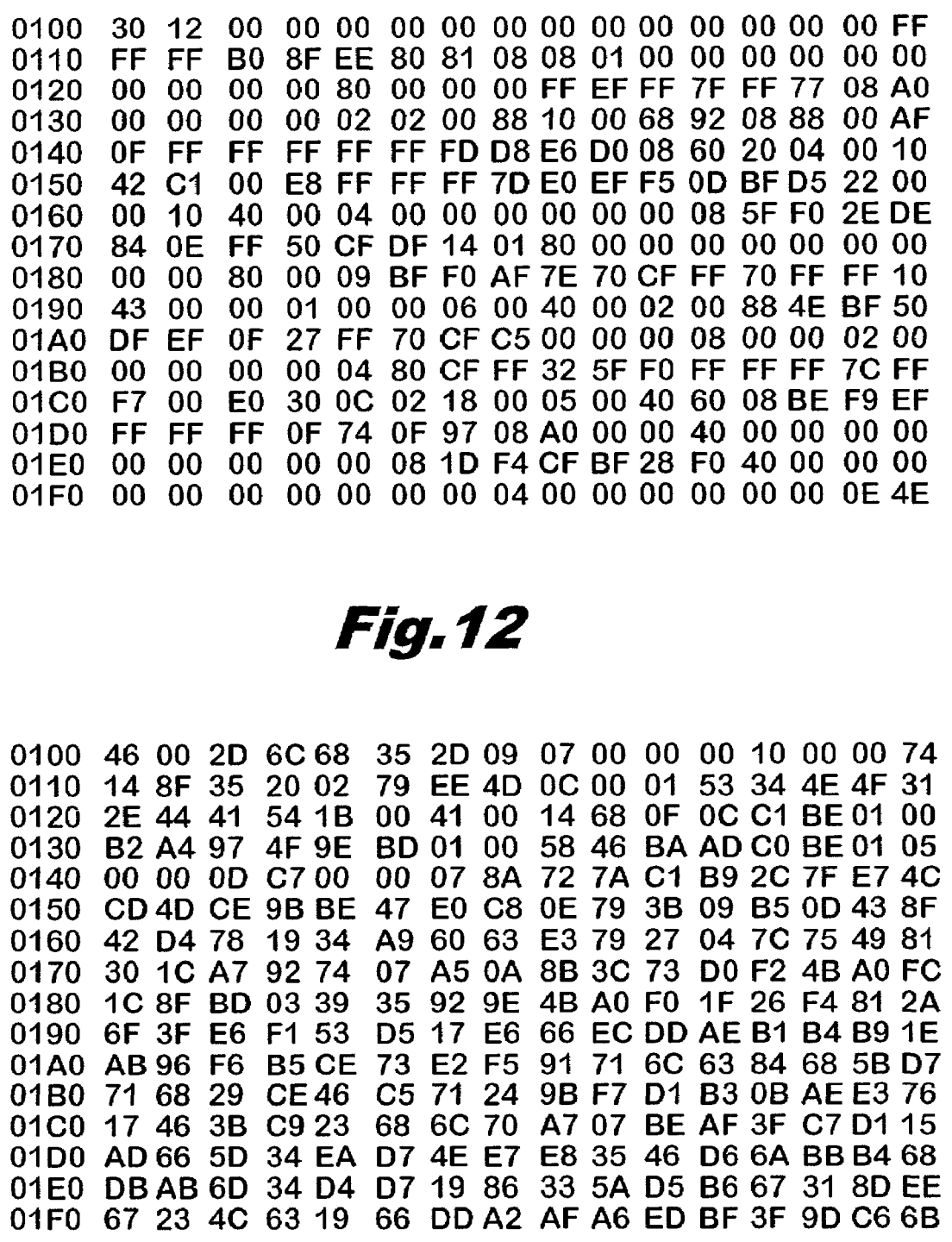

FIG. 11 shows a part of the correction data of the LED head 2 corresponding to the width of paper of the A4 size at a resolution of 600 dpi. The correction data comprises data of 4992 dots having an information amount of 16 gradations, that is, 4 bits every dot corresponding to each LED element 7b. Therefore, a capacity of the correction data is equal to 2496 bytes (=4992×4 bits).

As will be obviously understood from this diagram, the correction data is data having high redundancy. Such data of high redundancy can be compressed at a high compression ratio by, for example, entropy encoding such that a repetitive pattern in non-compression data is searched, a short code is allocated to the data having a high frequency, a variable length encoding is performed, and the data is compressed. As entropy encoding, for example, there is known an encoding method such as LZ77 or the like disclosed in Ziv J. and Lempel A., "A Universal Algorithm for Sequential Data Compression", IEEE Transactions on Information Theory, Vol. 23, No. 3, pp. 337 to 343, or the like.

Therefore, each compressor/decompressor 10 compresses and decompresses the correction data by, for example, LZ77. FIG. 12 shows a part of the correction data in the case where the correction data shown in FIG. 11 has been compressed by LZ77. A redundancy is extremely small in this case. A capacity of the correction data is equal to, for example, about 1714 bytes although it depends on the redundancy of the correction data before the compression. A compression ratio in this case is equal to 68.7%.

If the data is not compressed, since the capacity of the correction data is equal to 2496 bytes, it cannot be stored into the EEPROM having a capacity of 2 kbytes, so that the EEPROM of 4 kbytes has to be used. However, if the correction data is compressed, the capacity thereof can be reduced to the capacity such that the data can be sufficiently stored in the EEPROM of 2 kbytes as mentioned above.

Therefore, by compressing the correction data, there is no need to use the EEPROM having an extremely large capacity and it is possible to contribute to the reduction of the costs of the apparatus. Particularly, this effect is remarkable in a color LED printer or the like using a plurality of LED heads.

Figure 13:
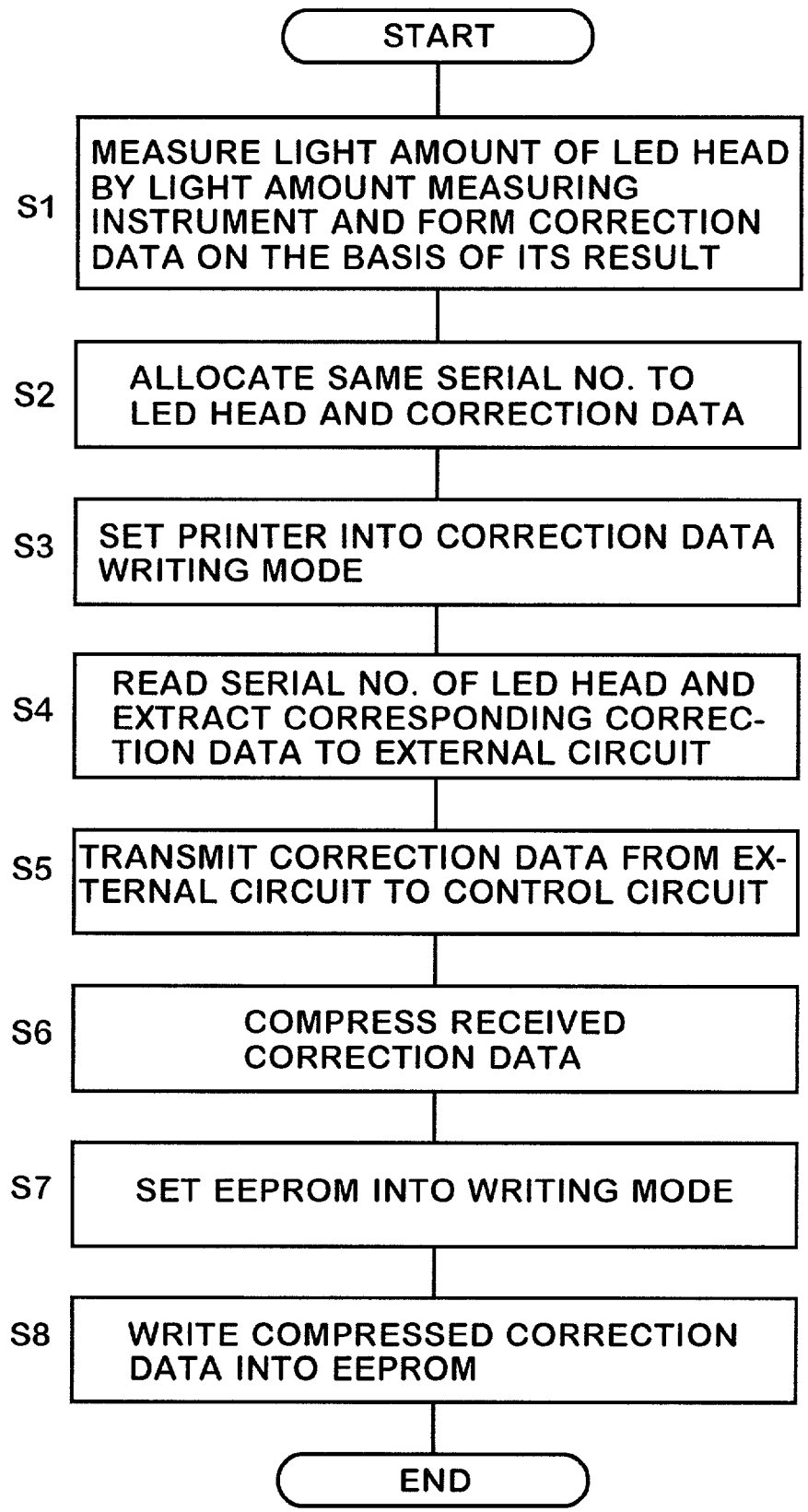

FIG. 13 is a flowchart showing processes such as formation and the like of the correction data in the electrophotographic printer according to the third or fourth embodiment of the invention. The processes shown in FIG. 13 are executed by using a measuring apparatus such as a light amount measuring instrument or the like provided outside of the electrophotographic printer, a control apparatus for instructing the writing operation or the like of the correction data to the electrophotographic printer, and the like.

First, for example, upon manufacturing of the LED head 2, manufacturing of the printer, or the like, the execution of the processes is started from step S1. In step S1, the measuring apparatus such as a light amount measuring instrument or the like measures a light amount of each of the LED elements 7b constructing the LED head 2 and forms correction data on the basis of a measurement result. The processing routine advances to step S2.

In step S2, identification information (ID information) such as a serial number or the like showing a correspondence between the formed correction data and the LED head is formed, and the ID information and the corresponding correction data are recorded in recording means such as a hard disk or the like of a personal computer. The ID information is displayed for the LED head corresponding to the ID information. Although it is displayed by, for example, a label or the like including the ID information, another display means can be also used so long as the correspondence with the correction data can be recognized.

In step S3, the control apparatus for instructing the writing operation or the like of the correction data to the electrophotographic printer is connected, the execution of a process for writing the correction data is instructed to the electrophotographic printer, and step S4 follows. Thus, the electrophotographic printer executes the writing process of the correction data and enters a state where the correction data from, for example, an external control apparatus can be written into the EEPROM 8.

In step S4, the control apparatus reads the ID information displayed to the LED head and reads out the correction data corresponding to the ID information from the recording means and step S5 follows.

In step S5, the control apparatus supplies the read-out correction data to the print controller 1 of the electrophotographic printer.

When the correction data is supplied from the control apparatus, the print controller 1 of the electrophotographic printer supplies the correction data to the compressor/decompressor 10 and instructs the compression in step S6 and step S7 follows. Thus, the compressor/decompressor 10 compresses the correction data and supplies the compressed correction data to the CPU 3.

In step S7, a predetermined signal is supplied to the EEPROM 8 so as to set the EEPROM 8 into the writing mode, and step S8 follows.

In step S8, the CPU 3 writes the compressed correction data from the compressor/decompressor 10 into the EEPROM 8 and finishes the process. Thus, the compressed correction data is written into the EEPROM 8.

The correction data written in the EEPROM 8 as mentioned above is read out from the EEPROM 8 when, for example, the power source of the electrophotographic printer is turned on, and the read-out data is decompressed and supplied to each holding unit 6c of the LED driver IC 6.

Figure 14:
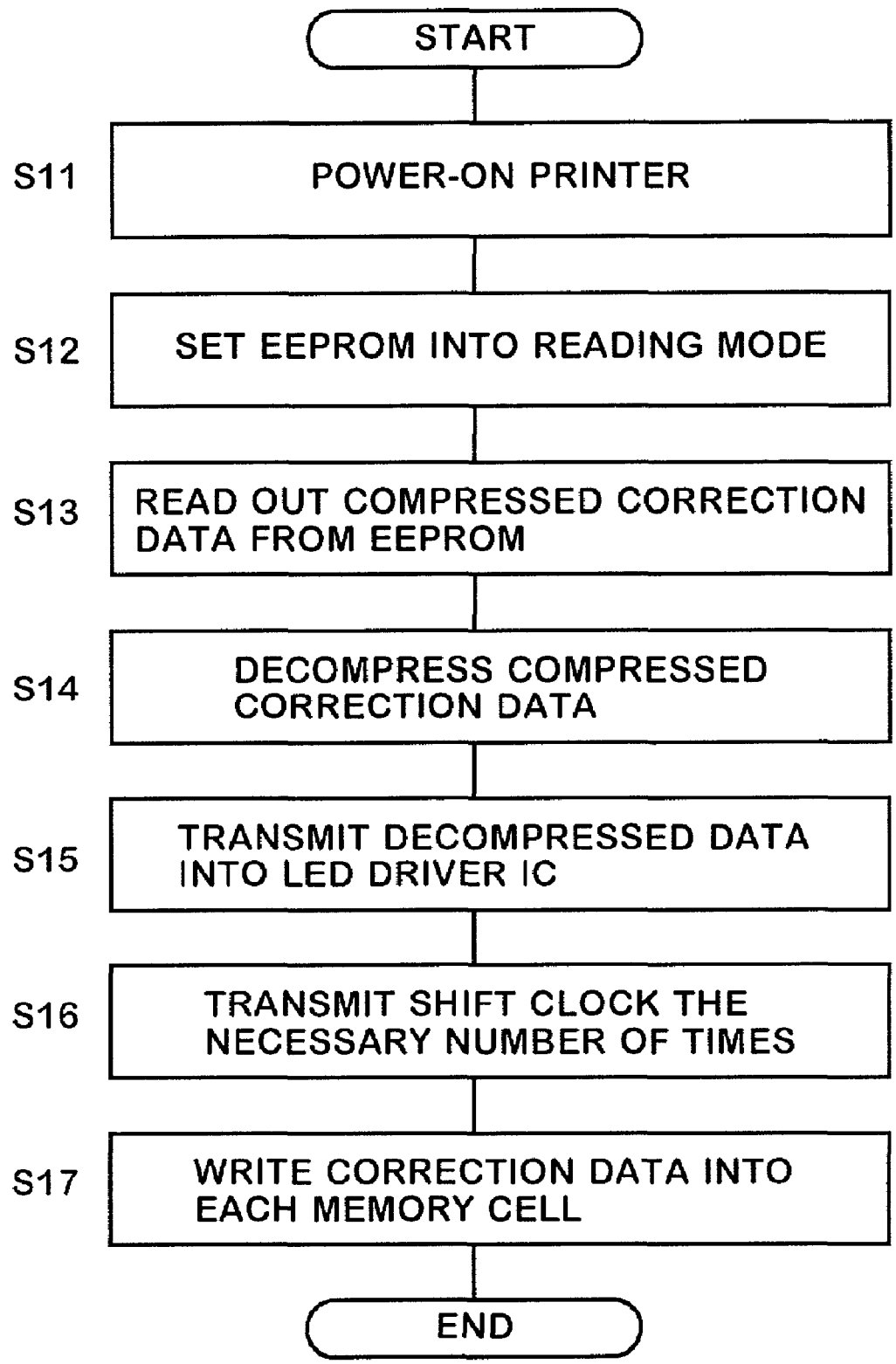
FIG. 14 is a flowchart showing a setting process of correction data.

FIG. 14 is a flowchart showing the setting process of such correction data. In step S11, when the power source of the electrophotographic printer is turned on, step S12 follows. The print controller 1 supplies data for setting the EEPROM into the reading mode to the EEPROM 8 so as to set it into the reading mode, and step S13 follows.

In step S13, the print controller 1 supplies a read start address to the EEPROM 8 and supplies a read clock to the EEPROM 8, and step S14 follows. Thus, the compressed correction data held in the read start address and subsequent addresses is read out from the EEPROM 8 in response to the clock and supplied to the print controller 1.

In step S14, the print controller 1 supplies the correction data sent from the EEPROM 8 to the compressor/decompressor 10, thereby allowing the correction data to be decompressed.

In step S15, the decompressed correction data is transmitted to the LED driver IC 6. In step S16, a predetermined number of clocks are transmitted to the LED driver IC 6, thereby allowing the correction data to be transferred by the shift register 6d formed in the LED driver IC 6 as mentioned above. When the correction data is transferred to the position corresponding to a predetermined holding unit 6c by the shift register 6d, the print controller 1 supplies a signal (STB4-N to STB1-N) for instructing each holding unit 6c to hold the data in the shift register 6d in step S17. Thus, the correction data is stored in each holding unit 6c and the setting of the correction data is finished.

In the electrophotographic printer, the correction data held in the EEPROM 8 can be read out from the external apparatus for the purpose of maintenance or the like.

Figure 15:
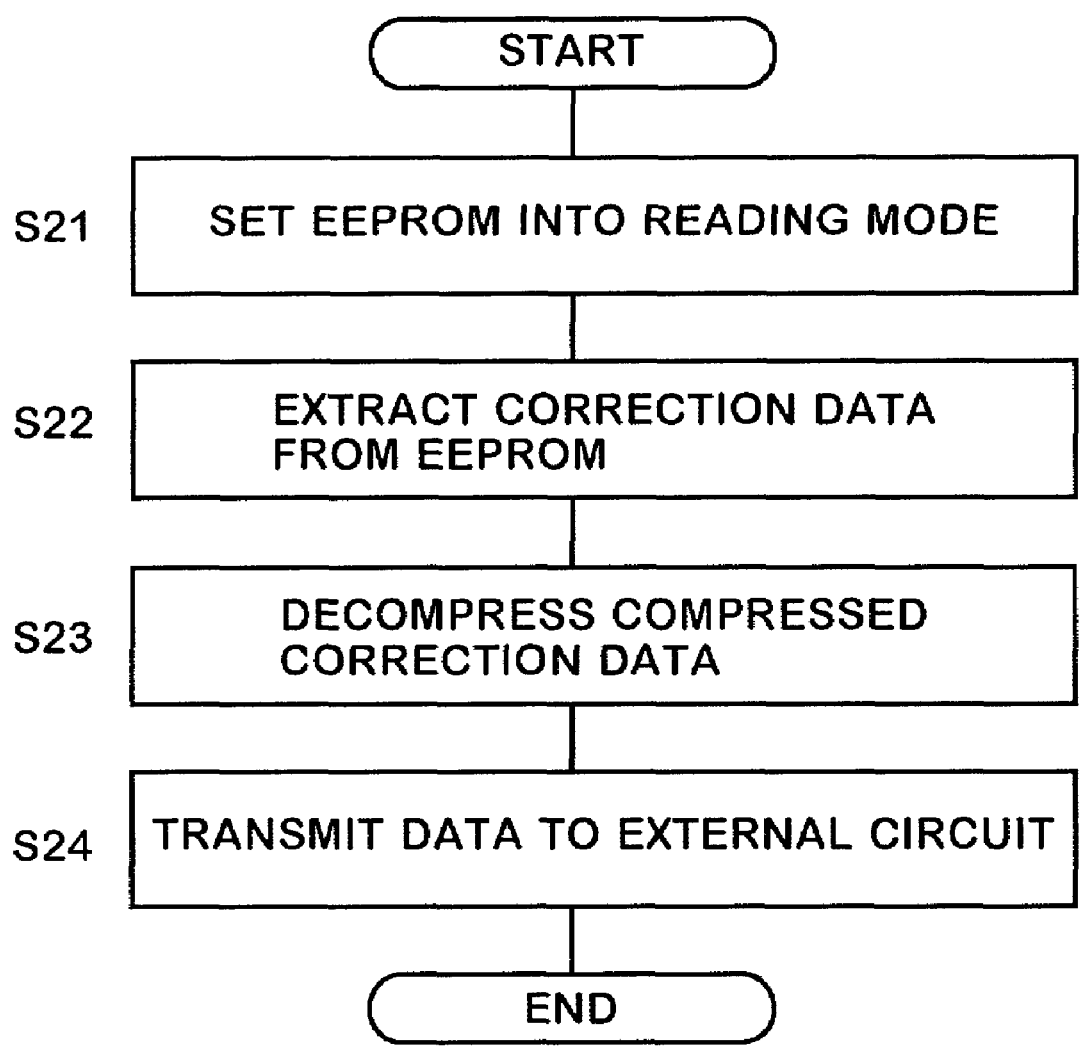
FIG. 15 is a flowchart showing a reading process of correction data from an external apparatus.
Figure 16:
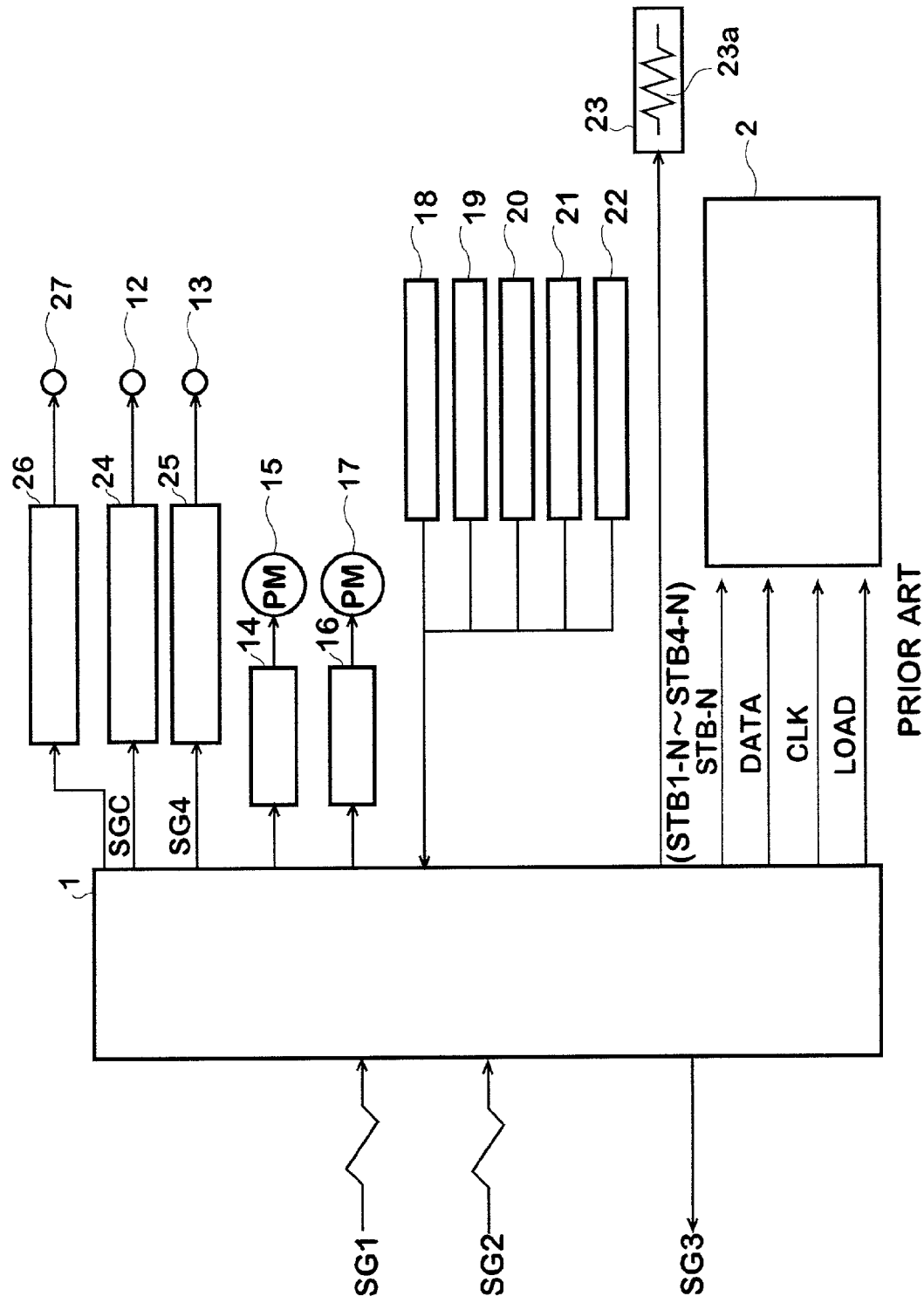
FIG. 16 is a block diagram showing a construction of a main section of a conventional electrophotographic printer.
Figure 17:
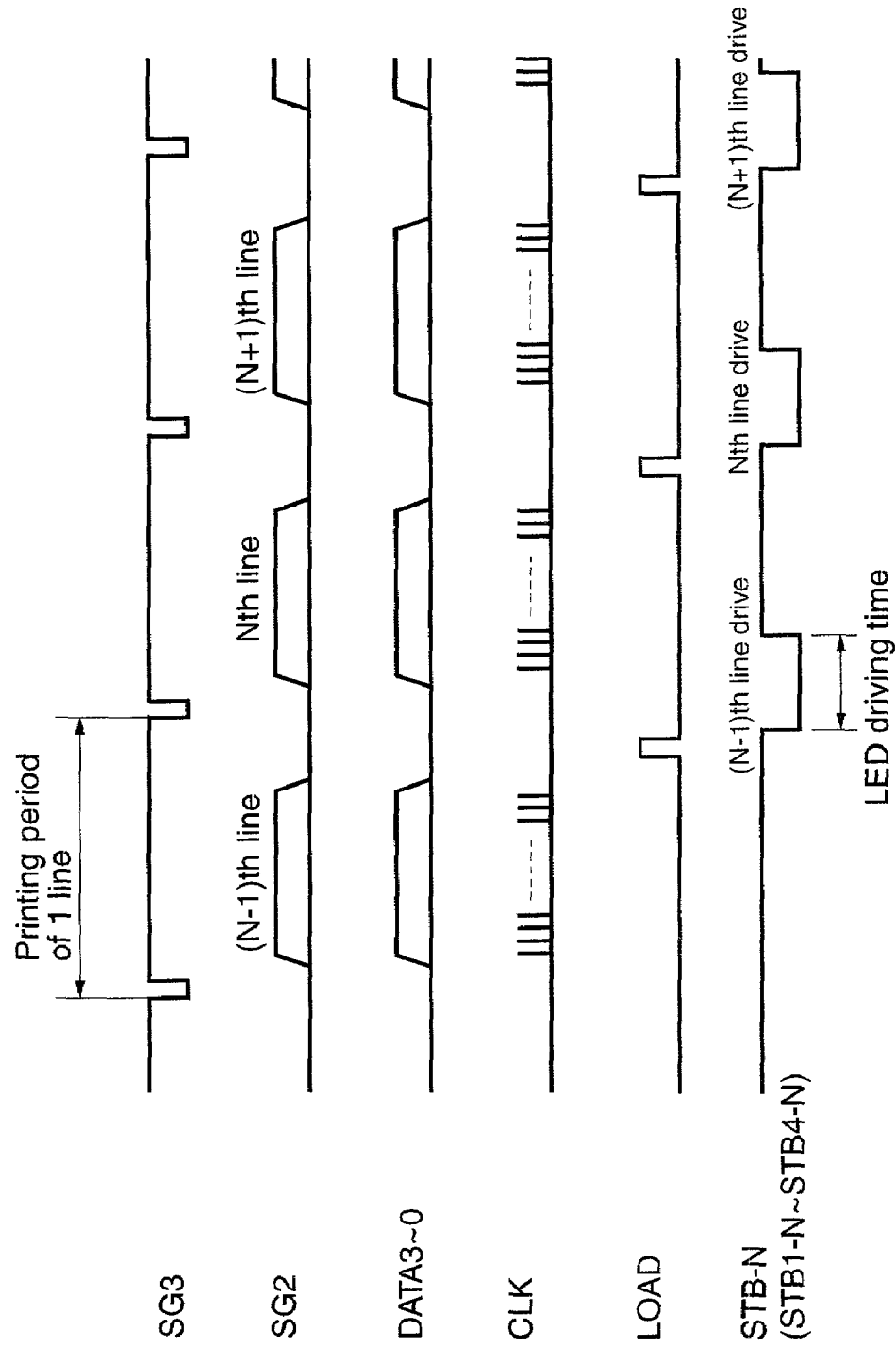
FIG. 17 is a time chart showing the printing operation of the conventional electrophotographic printer.

FIG. 15 is a flowchart showing the reading process of the correction data from the external apparatus as mentioned above. In step S21, when the external apparatus instructs the print controller 1 to read out the correction data, the print controller 1 supplies the data for setting the EEPROM into the reading mode to the EEPROM 8, thereby setting the EEPROM 8 into the reading mode.

When the EEPROM 8 is set into the reading mode, the print controller 1 supplies the read start address to the EEPROM 8 and, further, supplies the read clock to the EEPROM 8 in step S22. Thus, the EEPROM 8 reads out the compressed correction data recorded in the read start address and subsequent addresses and supplies it to the print controller 1.

When the compressed correction data is supplied from the EEPROM 8, the print controller 1 supplies the correction data to the compressor/decompressor 10, thereby allowing the data to be decompressed in step S23.

When the decompressed correction data is supplied from the compressor/decompressor 10, the print controller 1 transmits the correction data to the external apparatus in step S24 and finishes the reading process.

Thus, the external apparatus can obtain the correction data, for example, upon repair or perform a maintenance such as correction or the like of the correction data based on the light amount of the LED element 7b which was measured again. In the electrophotographic printer, therefore, the external apparatus can easily obtain the correction data through the print controller 1 and easily perform a process such as maintenance or the like.

Although the example using the EEPROM of the serial access type as a non-volatile memory has been shown in each of the above embodiments, another non-volatile memory such as a flash memory of the serial access type or the like can be also used in place of such an example.

Although the case where the LED elements are used as driven elements and the LED array 7 formed by linearly arranging the LED elements has been described above in each of the embodiments, as driven elements 7, for example, the invention can be also applied to a driving circuit for driving driven elements such as exothermic elements or the like constructing a thermal head by being linearly arranged as disclosed in, for example, JP-A-5-330124 or the like.

Although the third and fourth embodiments have been described with respect to the case where the signal lines for performing the writing and reading operations into/from the EEPROM are shared with the strobe signal lines in a manner similar to the cases of the first and second embodiments, the signal lines for performing the writing and reading operations into/from the EEPROM can be also provided separately from the strobe signal lines so long as the correction data is compressed and stored into the EEPROM. Many other modifications and variations are possible within the scope of the technical idea of the present invention.

In the image recording apparatuses according to the invention, as mentioned above, the correction data for correcting the driving of each driven element is read out from the memory serving as memory means for storing the correction data prior to the printing operation and written into the auxiliary memory serving as auxiliary memory means for temporarily storing the correction data under the control of the CPU and, thereafter, the correction data is sent from the auxiliary memory means to the driving mechanism serving as driving means through the print data lines.

According to the invention, therefore, the correction data can be properly sent to the driving mechanism without causing the foregoing problem on the time lag of the correction data due to the internal clock of the correcting operation control IC as in the conventional apparatus. Thus, it is possible to contribute to the improvement of the reliability. A design margin such as a change or the like of the timing which was conventionally an obstacle for realization of a high operating speed is reduced and it is possible to contribute to the realization of a high speed of the operation.

Since the correction data can be sent to the driving mechanism through the print data lines extending from the CPU to the driving mechanism, the dedicated lines for the correction data as in the conventional apparatus become unnecessary and the construction can be simplified.

What is claimed is:

1. An image recording apparatus comprising:
   a plurality of groups of driven elements which are driven for printing on a medium;
   a driving section connected to the driven elements;
   a first memory for storing a plurality of correction values for correcting for variations in the driven elements, each correction value corresponding to a respective one of the driven elements;
   a print controller for receiving an input data signal and controlling the driving section and the first memory, the print controller generating a clock signal the print controller including a second memory; and
   a connection arrangement for connecting the print controller to the driving section, the connection arrangement including a clock signal line, a data line, and a plurality of strobe signal lines, the strobe signal lines connecting the print controller to the first memory in addition to the driving section,
   wherein the print controller reads the connection values out of the first memory using the strobe signal lines, the read-out correction values being stored in the second memory and then being transmitted to the driving section over the data line in synchronism with the clock signal,
   wherein the print controller generates print data from the input data and transfers the print data to the driving section over the data line in synchronism with the clock signal, the print data being transferred to the driving section after the correction values have been transferred to the driving section, and
   wherein the print controller generates strobe signals that are conveyed to the driving section via the strobe signal lines and that cause the driving section to drive the groups of driven elements in accordance with the print data.

2. An apparatus according to claim 1, wherein
   said second memory and said driving section are provided in a head.

3. An apparatus according to claim 1, wherein
   said correction values stored in said first memory are compressed correction values,
   said print controller comprises a decompressing circuit for decompressing the compressed correction values stored in said first memory, and
   decompressed correction data are transmitted to said driving section.

4. An apparatus according to claim 1, wherein said print controller comprises a compressing circuit for compressing correction values to be stored into said first memory and the correction values are compressed by said compressing circuit and written into said first memory.

5. An apparatus according to claim 1, wherein said driven elements are LED elements for emitting recording light.

6. An apparatus according to claim 1, wherein
   said print controller is constructed so as to be connectable to an external upstream apparatus, said upstream apparatus supplying said input data to said print controller and
   when a read command for reading of the correction values is received from said upstream apparatus, said print controller reads out the correction values from said first memory and transmits them to said upper apparatus.

7. An apparatus according to claim 1, wherein said driven elements are thermal elements.

8. An apparatus according to claim 1, wherein the driven elements are light-emitting elements, and the correction values are used to compensate for variations in light emission of the light-emitting elements.

9. An apparatus according to claim 1, wherein
the first memory is an EEPROM,
the strobe signal lines include first, second, third, and fourth strobe signal lines that are respectively connected to first, second, third, and fourth terminals of the EEPROM, and
the print controller reads the correction values out of the first memory by setting the first strobe signal line at a predetermined logic level, emitting the clock signal on the second strobe signal line, emitting a start address on the third strobe signal line, and receiving correction values from the first memory over the fourth strobe signal line.

10. An image recording apparatus comprising:
a plurality of groups of driven elements which are driven for printing on a medium;
a driving section connected to the driven elements, the driving section including a plurality of driving circuits which drive said groups of driven elements;
a first memory for storing a plurality of correction values for correcting for variations in the driven elements, each correction value corresponding to a respective one of the driven elements;
a print controller for receiving an input data signal and controlling the driving section and the first memory, the print controller generating a clock signal; and
a connection arrangement for connecting the print controller to the driving section, the connection arrangement including a clock signal line, a data signal line, and a plurality of strobe signal lines, the strobe signal lines connecting the print controller to the first memory in addition to the driving section,
wherein the print controller generates print data from input data and transfers the print data to the driving section over the data signal line in synchronism with the clock signal,
wherein the print controller comprises a CPU which generates strobe signals that are conveyed to the driving section via the strobe signal lines to cause the driving section to drive the groups of driven elements in accordance with the print data, and
wherein said print controller further comprises an auxiliary second memory, and reads the correction values out of the first memory via the strobe signal lines for temporary storage of the correction values in the second memory, and thereafter conveys the correction values to the driving section over the data signal line prior to a printing operation.

11. An apparatus according to claim 10, wherein said first memory has control terminals for controlling the operation of said first memory and data input/output terminals, and said control terminals and said input/output terminals are connected to said strobe signal lines.

12. An apparatus according to claim 11, wherein said first memory is subjected to an operation control for writing said correction values into said first memory and reading out said correction values into said second memory by the strobe signals which are supplied from said strobe signal lines to said control terminals.

13. An apparatus according to claim 10, wherein said first memory is an EEPROM.

14. An apparatus according to claim 10, wherein the print controller further comprises a compressing circuit for compressing said correction values which are stored in said first memory, and wherein said CPU decompresses said compressed correction values out from said first memory and supplies the decompressed values read to said driving section through said second memory and said data signal line.

15. An apparatus according to claim 12, wherein
said first memory has a data input terminal, a data output terminal, a selection terminal, and a clock terminal, and each of said strobe signal lines is connected to a respective one of the terminals.

16. An apparatus according to claim 15, wherein the strobe signal lines include a strobe signal line that is connected to said selection terminal of said first memory and a strobe signal line that is connected to said clock terminal of said first memory.

17. An apparatus according to claim 15, wherein
said first memory further has a write inhibition terminal, and
said CPU transmits a permission signal to permit the driving of said driven elements to said driving section and said write inhibition terminal of said first memory and, when the driving of said driven elements is permitted by said permission signal, a writing operation to said first memory is inhibited.

18. An apparatus according to claim 10, wherein
the first memory is an EEPROM,
the strobe signal lines include first, second, third, and fourth strobe signal lines that are respectively connected to first, second, third, and fourth terminals of the EEPROM, and
the CPU reads the correction values out of the first memory by setting the first strobe signal line at a predetermined logic level, emitting the clock signal on the second strobe signal line, emitting a start address on the third strobe signal line, and receiving correction values from the first memory over the fourth strobe signal line.

* * * * *